(12) United States Patent
Wells

(10) Patent No.: US 12,296,662 B2
(45) Date of Patent: May 13, 2025

(54) AUTOMOTIVE CARGO/TRAY COVER ASSEMBLY

(71) Applicant: Retract Canopy Systems Pty Ltd, Queensland (AU)

(72) Inventor: Simon Lee Owen Wells, Queensland (AU)

(73) Assignee: Retract Canopy Systems Pty Ltd, Queensland (AU)

( * ) Notice: Subject to any disclaimer, the term of this patent is extended or adjusted under 35 U.S.C. 154(b) by 228 days.

(21) Appl. No.: 17/927,223

(22) PCT Filed: Jul. 1, 2021

(86) PCT No.: PCT/AU2021/050708
§ 371 (c)(1),
(2) Date: Nov. 22, 2022

(87) PCT Pub. No.: WO2022/000044
PCT Pub. Date: Jan. 6, 2022

(65) Prior Publication Data
US 2023/0234430 A1   Jul. 27, 2023

(30) Foreign Application Priority Data

Jul. 2, 2020   (AU) ................................ 2020902254

(51) Int. Cl.
*B60J 7/06*   (2006.01)
*E05F 15/652*   (2015.01)

(52) U.S. Cl.
CPC ............... *B60J 7/064* (2013.01); *B60J 7/062* (2013.01); *E05F 15/652* (2015.01);
(Continued)

(58) Field of Classification Search
CPC ... B60J 7/061; B60J 7/062; B60J 7/068; B60J 7/064; B60J 1/1838; B60J 7/102;
(Continued)

(56) References Cited

U.S. PATENT DOCUMENTS 2,950,727 A   8/1960   Dunn
3,845,591 A * 11/1974   Stine .................. E04B 1/34305
                                                160/202
(Continued)

FOREIGN PATENT DOCUMENTS

EP   2977248 A1   1/2016
GB   267730 A     3/1927
(Continued)

OTHER PUBLICATIONS

Search Report of corresponding Australian Patent Application No. 2020902254, dated May 25, 2021, 22 pages.
(Continued)

*Primary Examiner* — Daniel J Colilla
(74) *Attorney, Agent, or Firm* — Tucker Ellis LLP

(57) ABSTRACT

The present application relates to an automotive cargo or a tray area cover assembly. The cover assembly includes a cover for covering a cargo or a tray area of an automobile. One or more rib supports are provided for moving over the cargo or the tray area and supporting the cover.

19 Claims, 34 Drawing Sheets

(52) U.S. Cl.
CPC ... *E05Y 2201/434* (2013.01); *E05Y 2201/684* (2013.01); *E05Y 2201/694* (2013.01); *E05Y 2201/702* (2013.01); *E05Y 2201/718* (2013.01); *E05Y 2400/40* (2013.01); *E05Y 2400/85* (2013.01); *E05Y 2900/53* (2013.01)

(58) Field of Classification Search
CPC ............. E04Y 2201/718; E04H 15/644; E04H 15/642; E04H 15/06; E04H 15/08; B60P 3/341
See application file for complete search history.

(56) References Cited

U.S. PATENT DOCUMENTS

| | | | |
|---|---|---|---|
| 4,252,363 | A | 2/1981 | Rodrigue |
| 4,289,346 | A | 9/1981 | Bourgeois |
| 4,649,947 | A * | 3/1987 | Tury .................... E04H 15/644 135/117 |
| 4,756,325 | A | 7/1988 | Daniels |
| 4,789,196 | A | 12/1988 | Fields |
| 4,883,305 | A * | 11/1989 | Horton ..................... B60J 7/062 296/105 |
| 5,443,295 | A | 8/1995 | Moberly |
| 5,531,497 | A | 7/1996 | Cheng |
| 8,047,600 | B2 | 11/2011 | Leblanc et al. |
| 10,029,546 | B2 | 7/2018 | Acosta Loyola |
| 10,173,505 | B2 | 1/2019 | Singer |
| 10,427,508 | B2 | 10/2019 | Singer |
| 2002/0079718 | A1 | 6/2002 | Neubrand |
| 2004/0155479 | A1 | 8/2004 | Willard |
| 2006/0017303 | A1 | 1/2006 | Weege et al. |
| 2010/0026037 | A1 | 2/2010 | Opie |
| 2011/0187148 | A1 | 8/2011 | Damsi |

FOREIGN PATENT DOCUMENTS

| | | |
|---|---|---|
| JP | S4897826 U | 11/1973 |
| JP | S4974606 U | 6/1974 |
| JP | S5339915 U | 4/1978 |
| JP | S61178220 A | 8/1986 |
| JP | H10100685 A | 4/1998 |
| JP | H1130059 A | 2/1999 |
| JP | 2014104775 A | 6/2014 |
| KR | 200471766 Y1 | 3/2014 |
| RU | 184298 U1 * | 10/2018 |

OTHER PUBLICATIONS

Agri-Cover, Inc., "Roll up truck box cover installation instructions", 2018, 16 pages.
Lucky International, "Truck cover tipper covers & tarpaulins", https://www.luckyinternational.net/truck-cover.html, retrieved May 13, 2021, 5 pages.
International Search Report of corresponding International Patent Application No. PCT/AU2021/050708, dated Sep. 21, 2021, 4 pages.
International Preliminary Report on Patentability of corresponding International Patent Application No. PCT/2021/050708, dated Jul. 6, 2022, 49 pages.
Examination report of corresponding Australian Application No. 2023200760, dated Jun. 24, 2024, 6 pages.

* cited by examiner

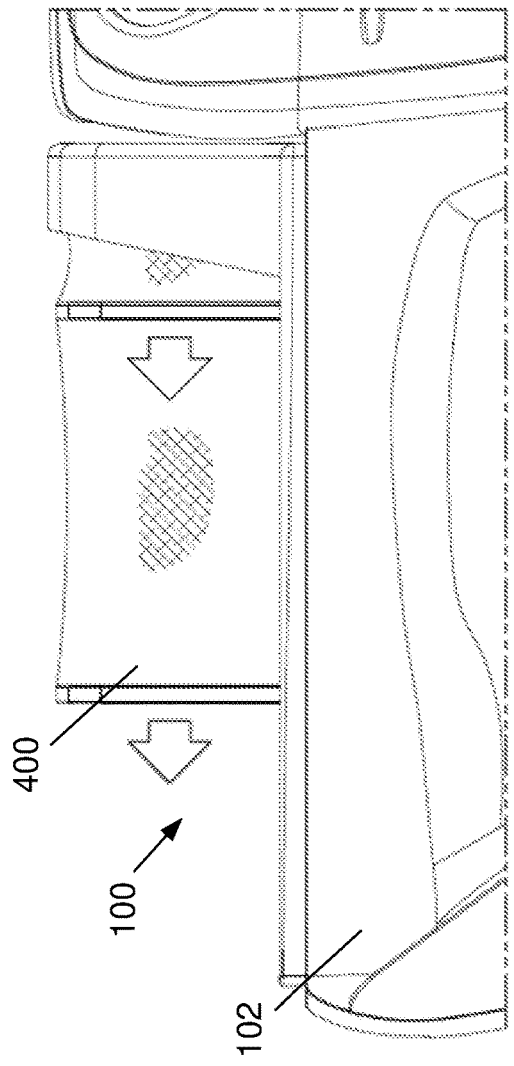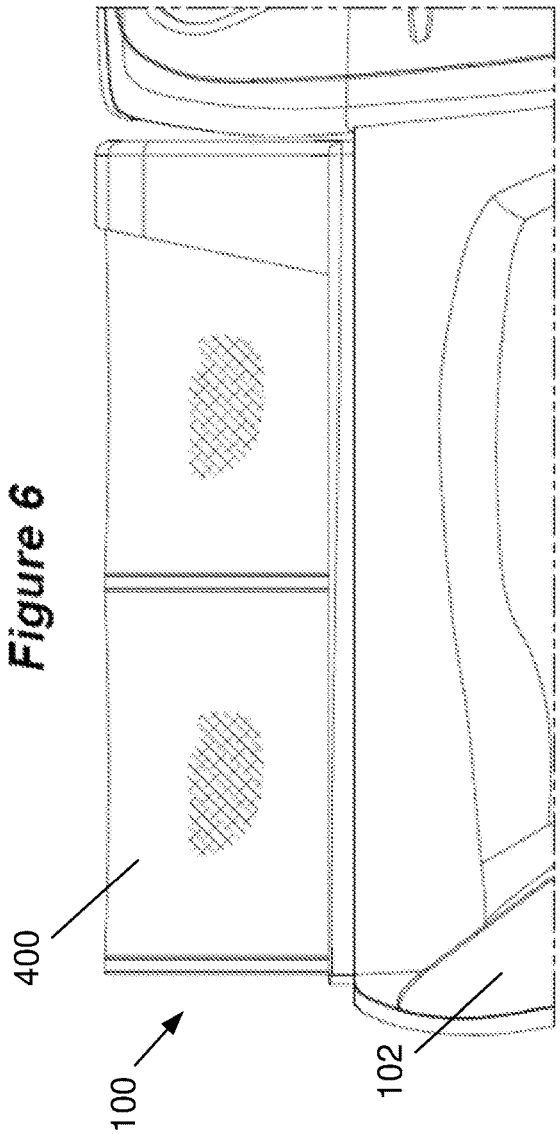

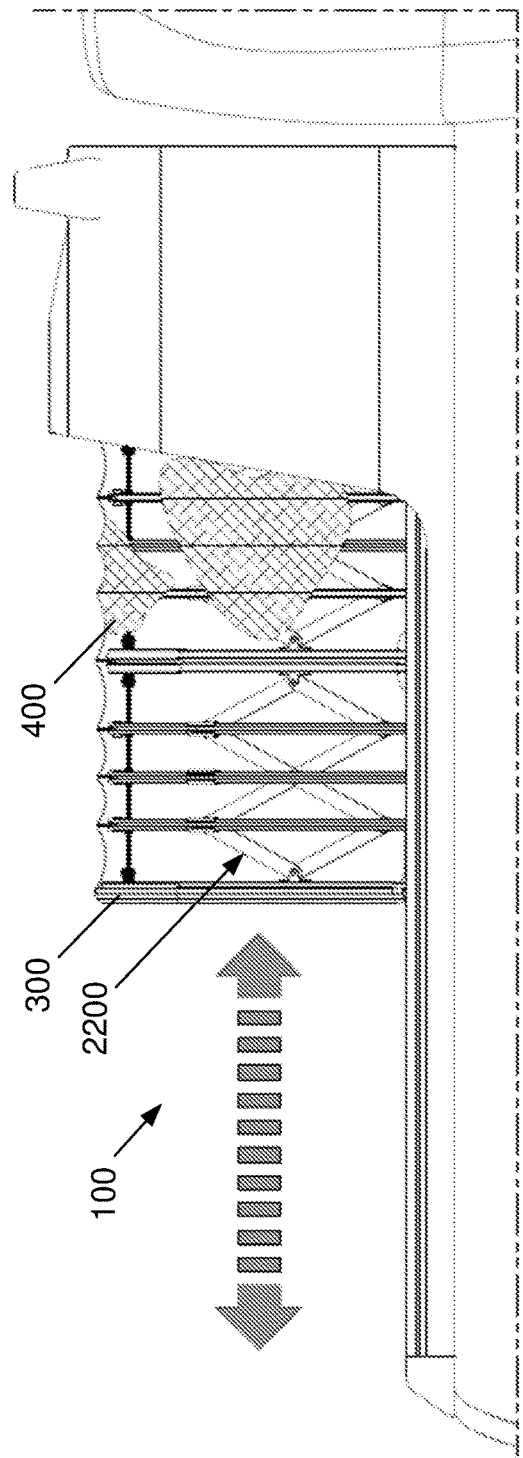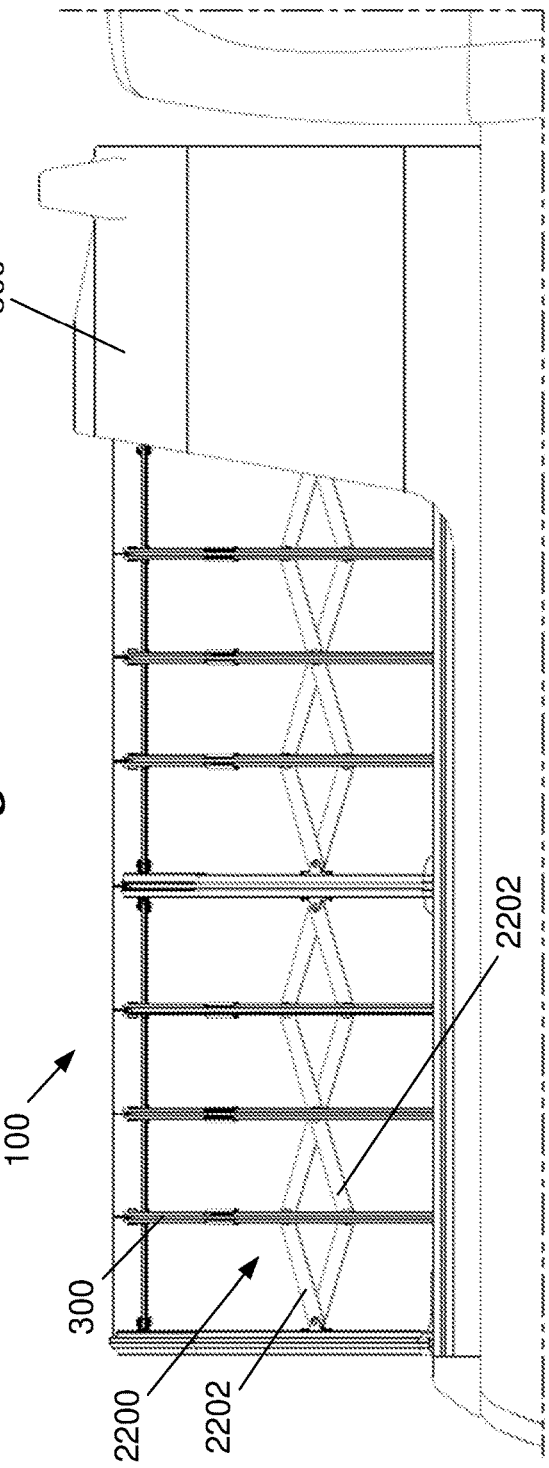

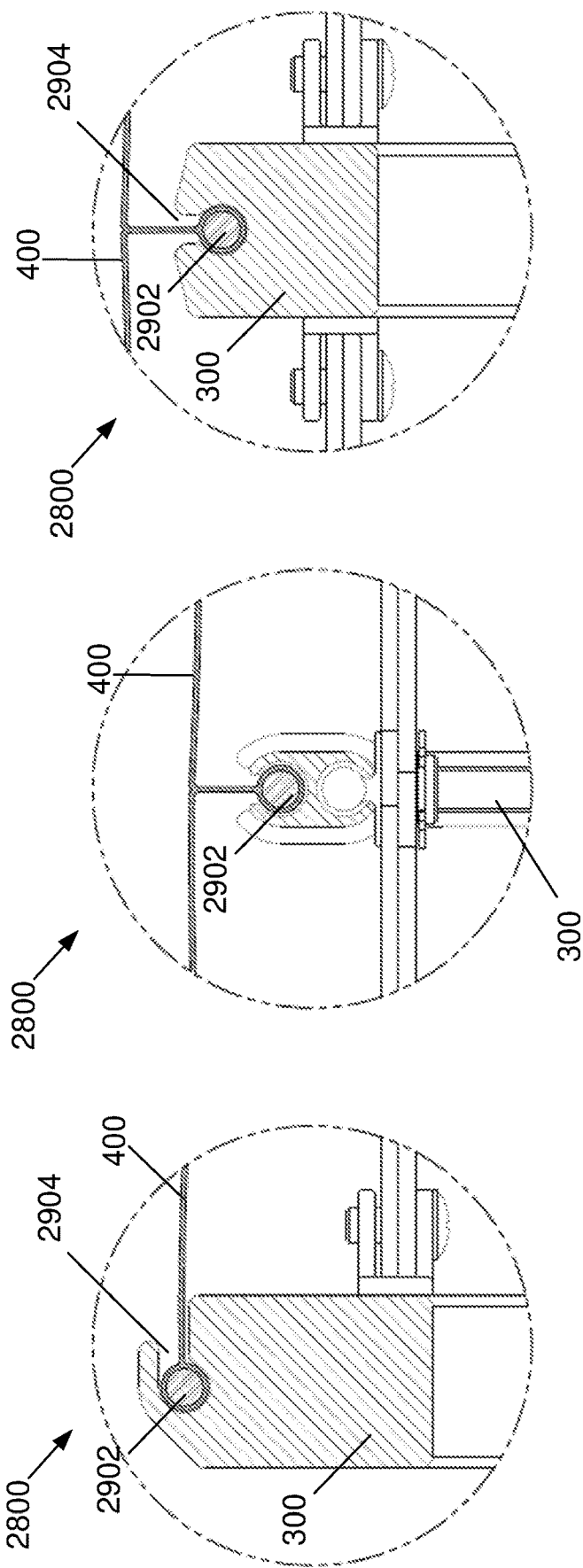

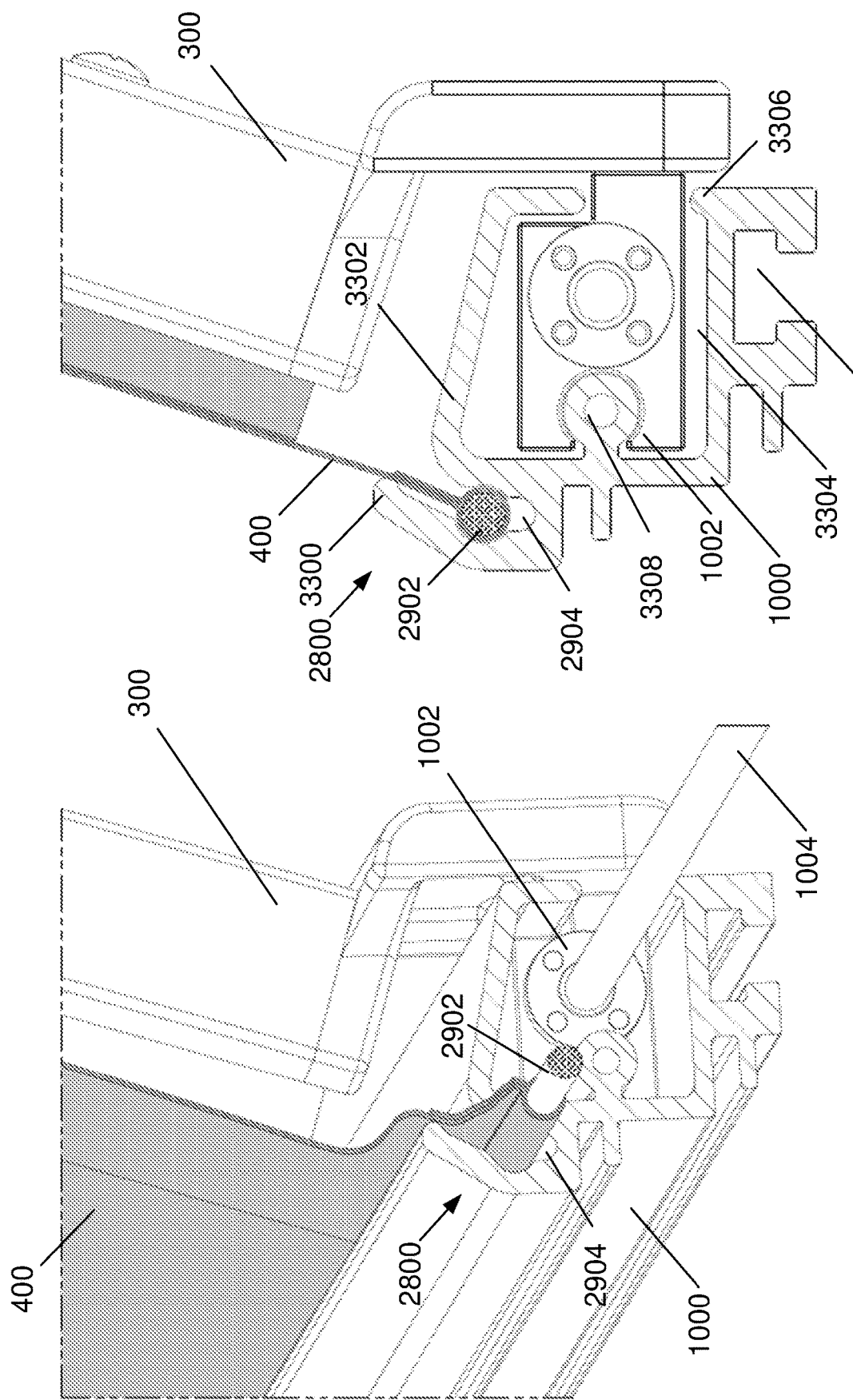

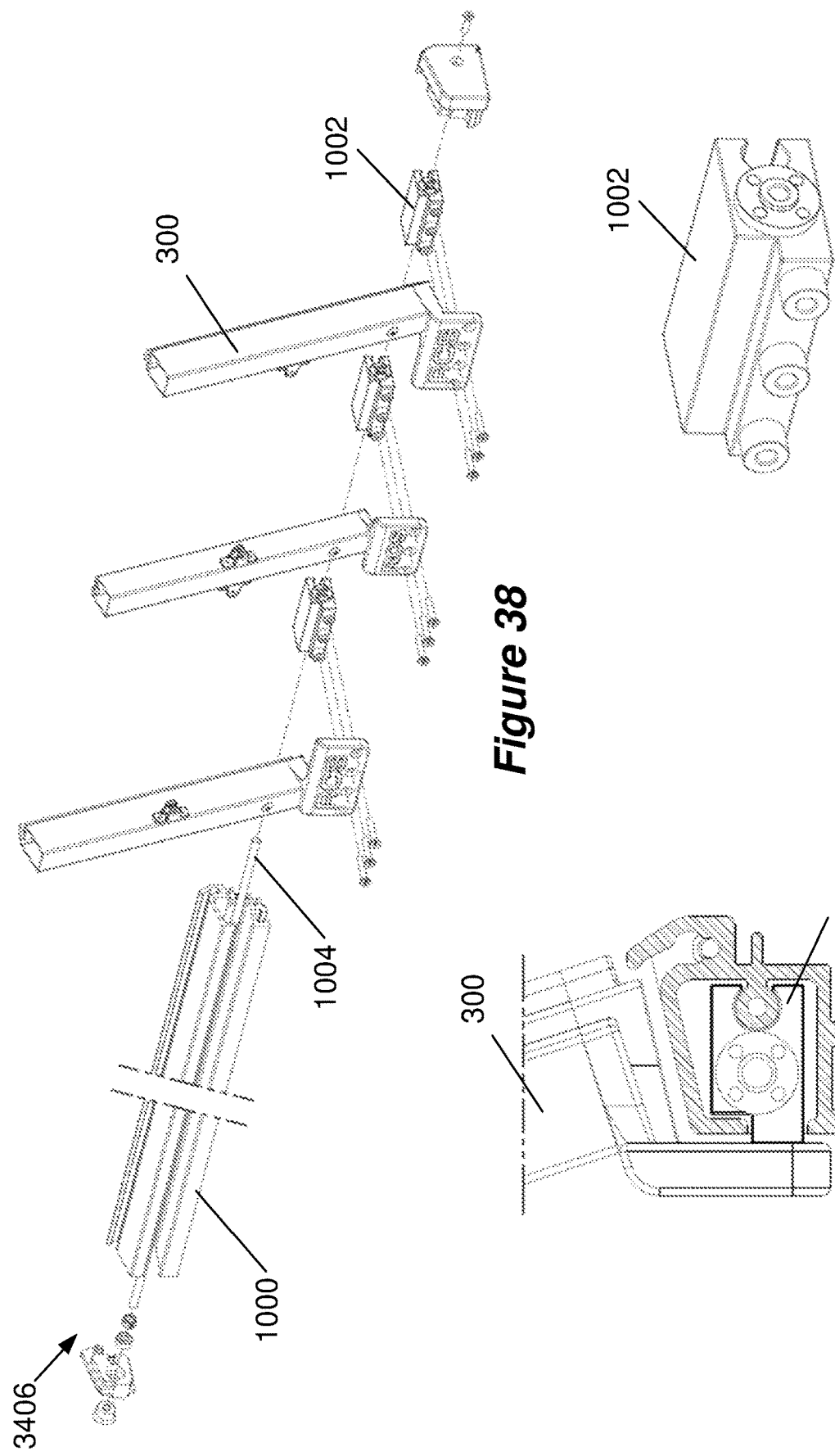

too long each tongue-in-groove arrangement including a bulbous tongue received in a complementary shaped groove.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 6 is a side view of the partially extended tray/cargo area cover assembly of FIG. 5;

FIG. 7 is a side view of the fully extended tray/cargo area cover assembly of FIG. 6;

FIG. 23 is a side view of the ute/pickup truck of FIG. 21 with the rib supports partially retracted;

FIG. 24 is a close-up view of the detail in FIG. 22;

FIG. 29 is a close-up view of the detail in FIG. 28;

FIG. 30 is a close-up view of the detail in FIG. 28;

FIG. 31 is a close-up view of the detail in FIG. 28;

FIG. 32 is a perspective close-up end sectional view of a rail assembly of the cover assembly;

FIG. 33 is an end view of the rail assembly of FIG. 32;

FIG. 38 is an exploded view of perspective view of the rail assembly of FIG. 34;

FIG. 39 is an end view of the rail assembly of FIG. 38;

FIG. 40 is a perspective view of a foot of a rib support of the rail assembly of FIG. 38;

DETAILED DESCRIPTION OF PREFERRED EMBODIMENTS

Figure 1:
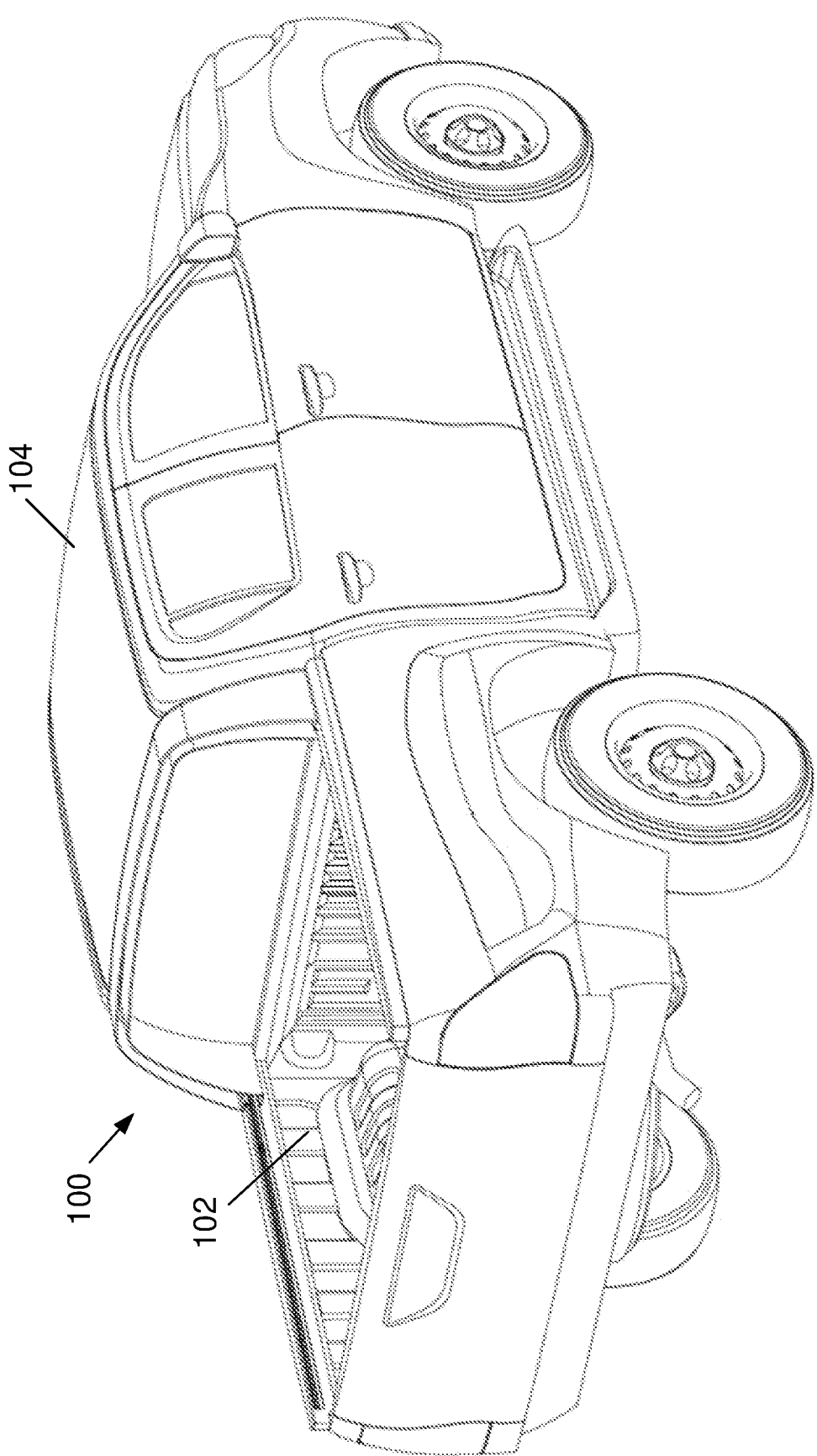
FIG. 1 is a rear perspective view of a ute/pickup truck retro-fitted with a retracted tray/cargo area cover assembly in accordance with an embodiment of the present invention.
Figure 2:
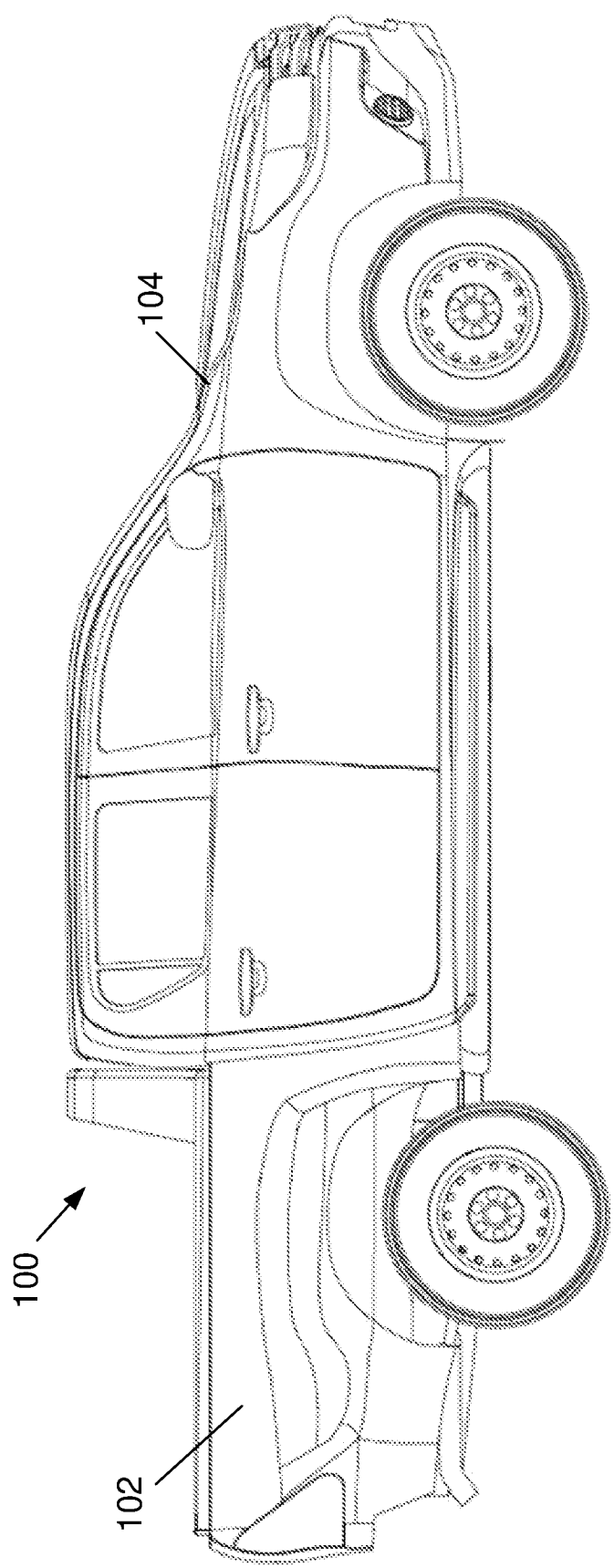
FIG. 2 is a side view of the ute/pickup of FIG. 1.

According to an embodiment of the present invention with reference to FIGS. 1 and 2, there is provided an automotive tray/cargo area cover assembly 100 for retro-fitting to the tray/cargo area 102 of a ute/pickup truck 104 (i.e. automobile).

Figure 3:
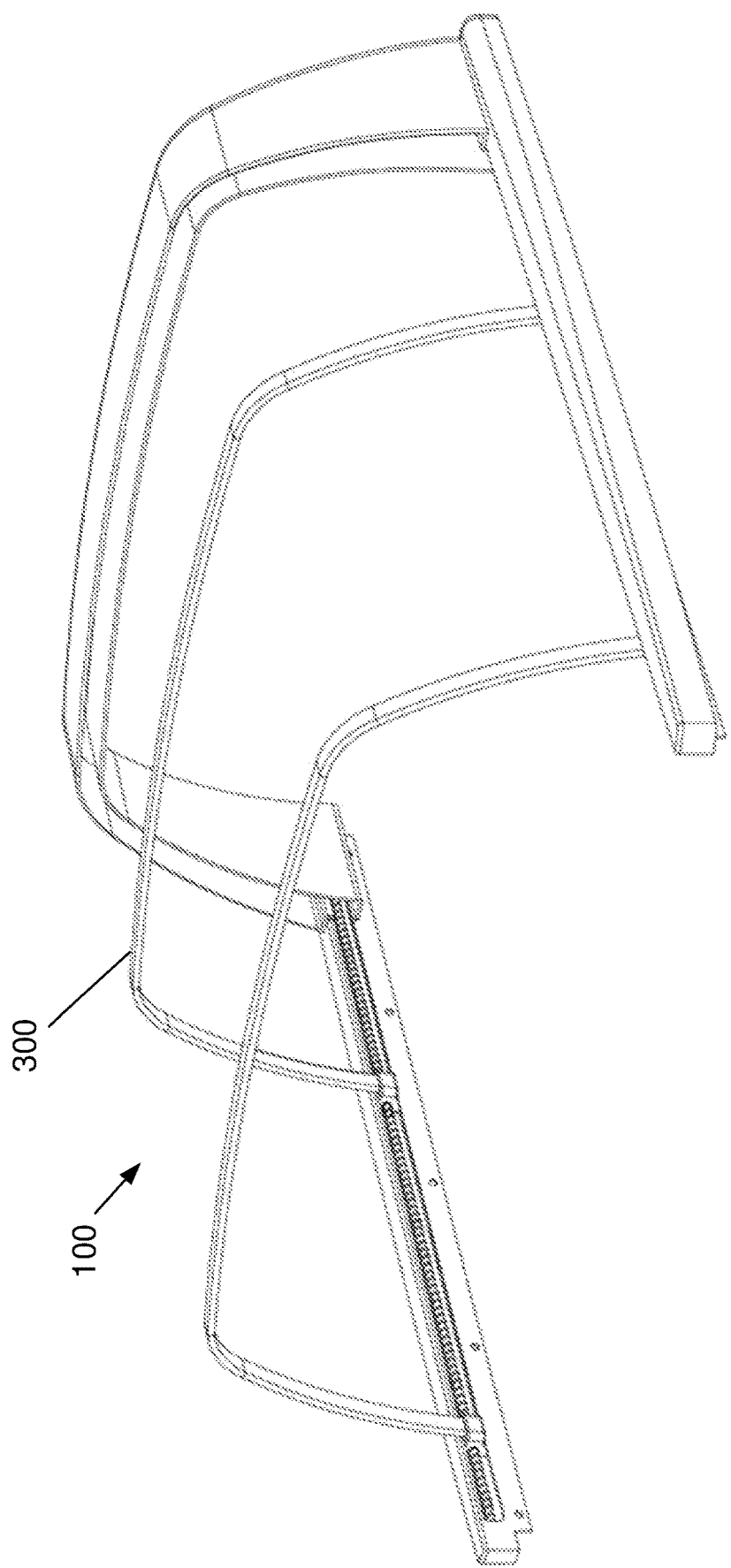
FIG. 3 is an upper perspective view of a partially extended tray/cargo area cover assembly in accordance with an embodiment of the present invention, without a cover fitted.

Turning to FIG. 3, the tray/cargo area cover assembly 100 includes U-shaped rib supports 300, which are retractable frame members for linearly moving over the tray 102 and supporting a cover.

Figure 4:
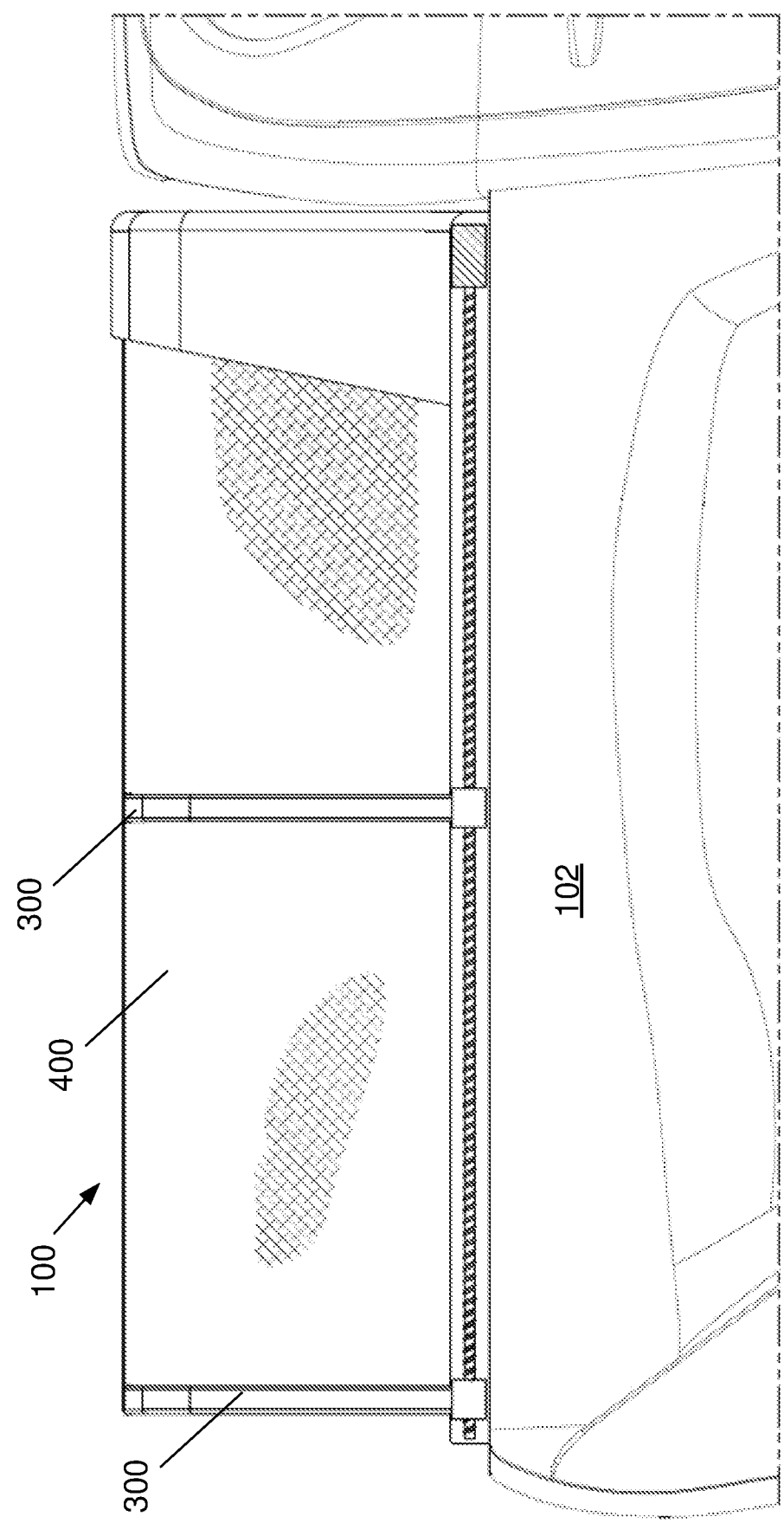
FIG. 4 is a side view of the extended tray/cargo area cover assembly of FIG. 3, with a cover fitted.

Turning to FIG. 4, the tray/cargo area cover assembly 100 includes a pliant cover 400 for covering the tray/cargo area 102.

Figure 5:
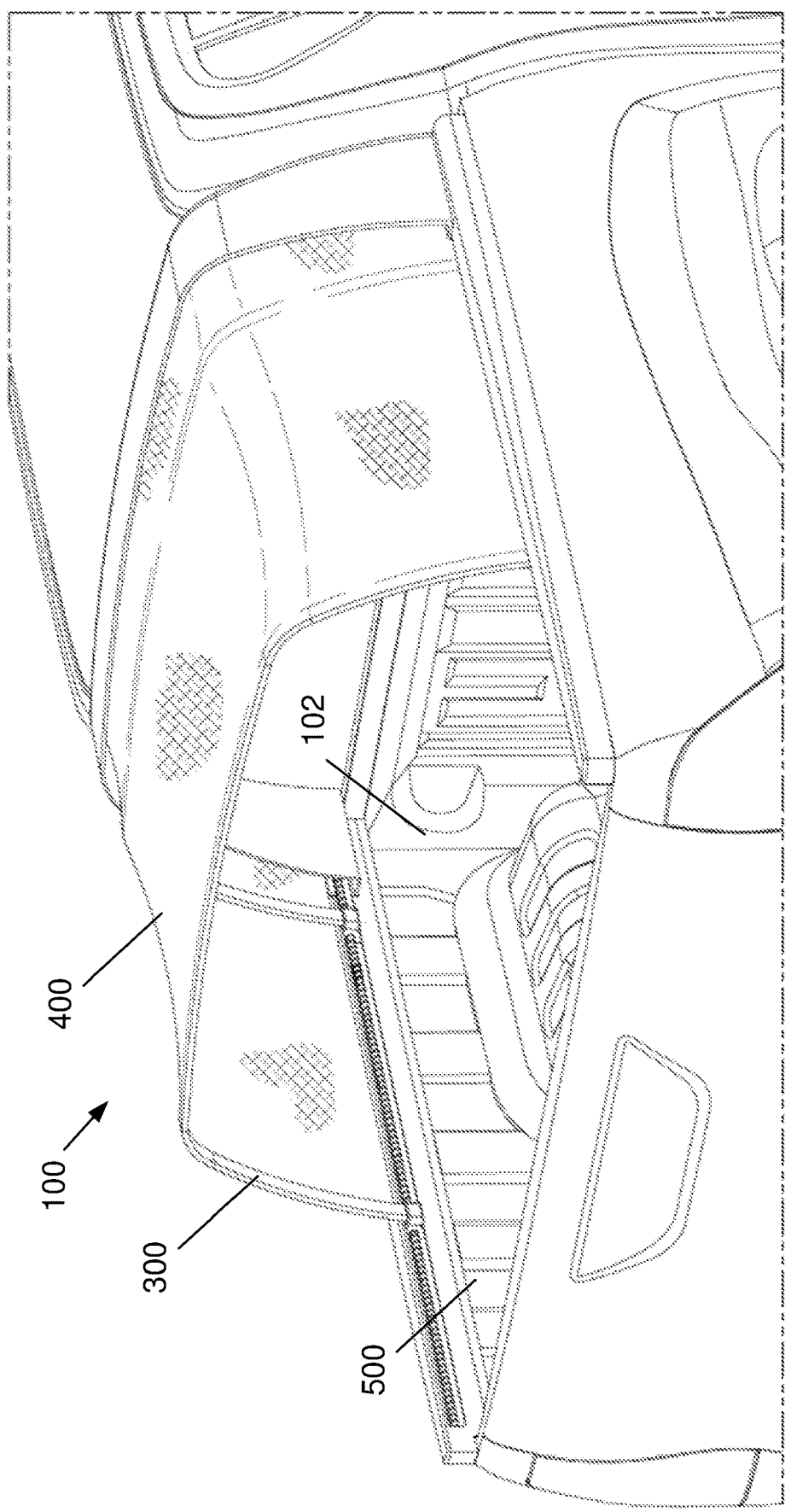
FIG. 5 is an upper perspective view of the partially extended tray/cargo area cover assembly of FIG. 3, with a cover fitted.

As can best be seen in FIG. 5, the supports 300 move over the tray/cargo area 102 and support the extended taught cover 400 above the height of the tray sides 500 to cover larger, taller loads in the tray 102 extending above the tray sides 500. The supports 300 are moved along the tray/cargo area 102 at a constant height. Accordingly, an item taller than the tray/cargo area sides can be safely covered and protected from the weather.

As can best be seen in FIGS. 6 and 7, the cover 400 is retractable and extendable long the tray/cargo area 102 in a concertina motion.

Figure 8:
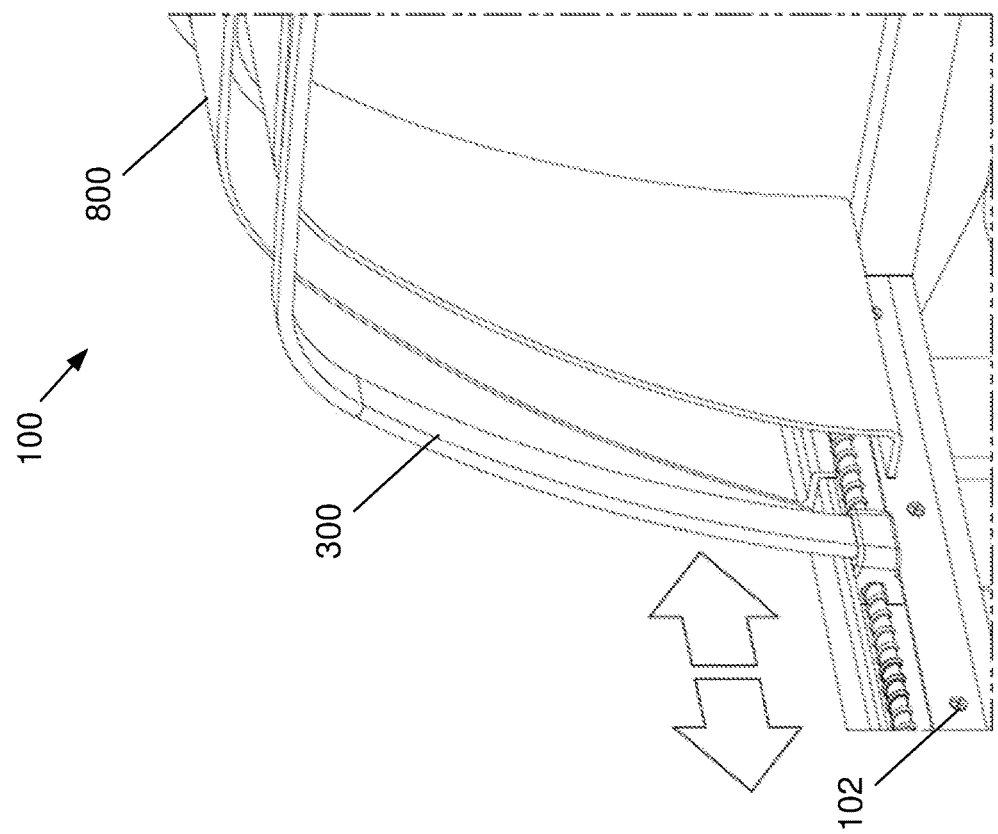
FIG. 8 is a close-up perspective view showing movement of supports of the tray/cargo area cover assembly.

Turning to FIG. 8, the assembly 100 further includes a vehicle roll bar 800 from which the cover 400 is housed and extends.

Figure 9:
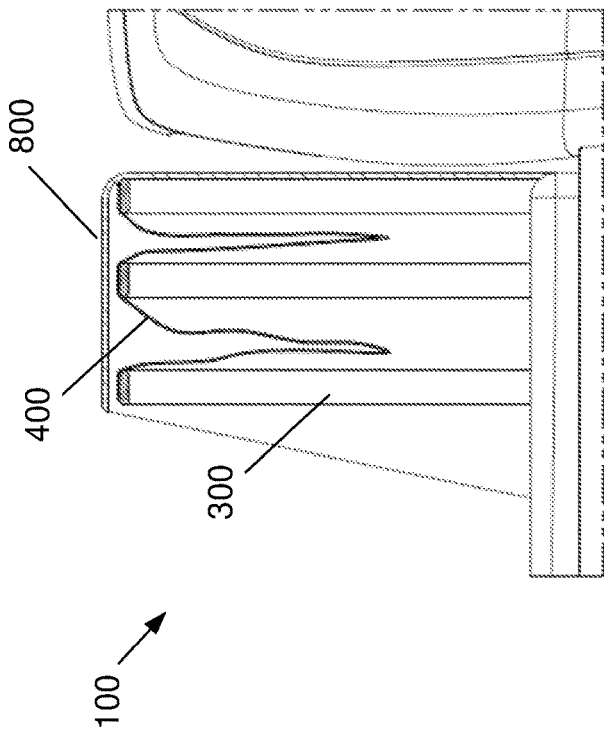
FIG. 9 is a sectional side view showing a fully retracted tray/cargo area cover assembly with cover fitted.

Turning to FIG. 9, the cover 400 and supports 300 retract into the roll bar 800. The foldable cover 400 is formed from one or more canvas sheets or alike material.

Figure 10:
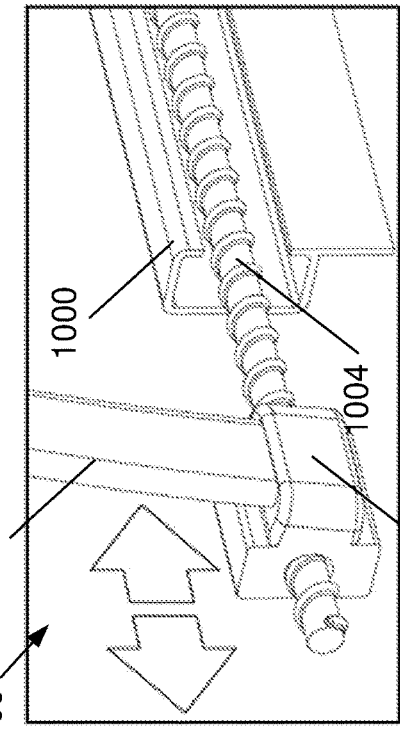
FIG. 10 is close-up perspective view of FIG. 8, with a portion of a guide rail removed.

Turning to FIG. 10, the assembly 100 further include a pair of guide rails 1000 on opposing sides of the tray/cargo area 102 for guiding the supports 300. Each support 300 has terminating feet 1002 that form a complementary fit within the rails 1000. Terminating feet 1002 may also be fitted rollers/wheels. The assembly 100 further includes a linear actuator, ball screw 1004, in respective rails 1000, for linearly moving the supports 300 when turned.

Figure 11:
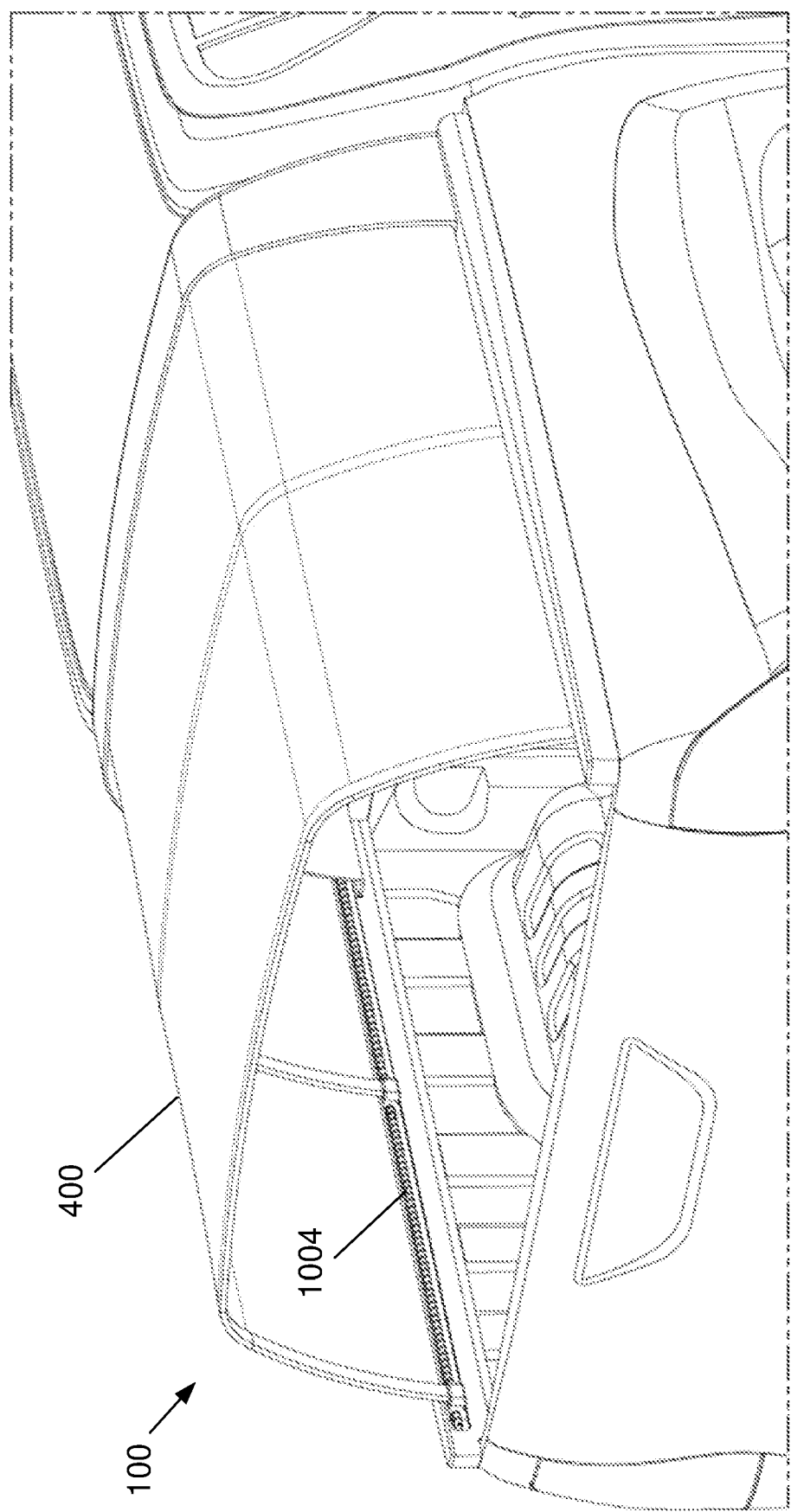
FIG. 11 is an upper perspective view of the fully extended tray/cargo area cover assembly of FIG. 5.

Turning to FIG. 11, the cover 400 is extended and retracted when a motor of the assembly 100 drives the linear actuator, ball screws 1004.

Figure 12:
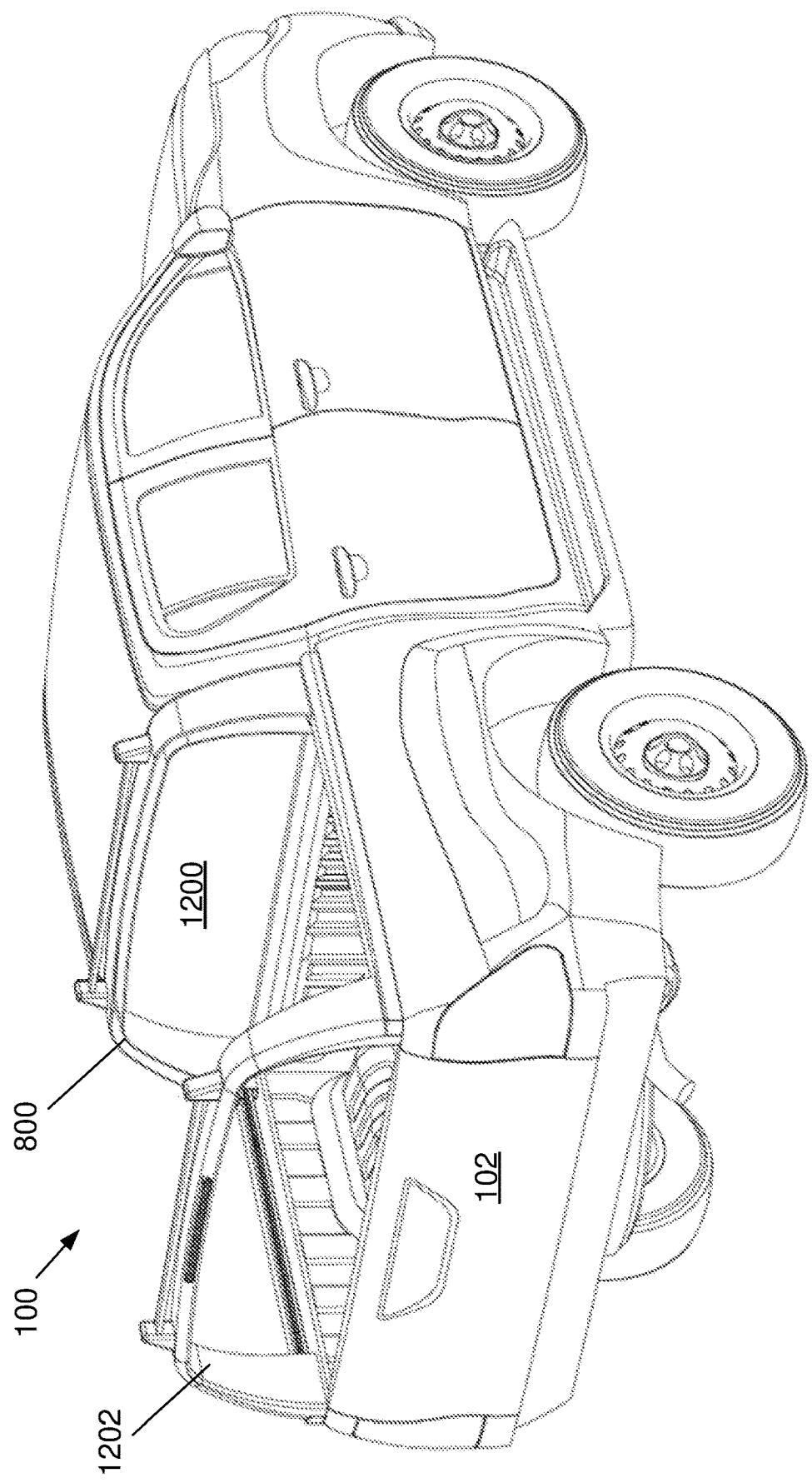
FIG. 12 is a rear perspective view of a ute/pickup truck retro-fitted with a retracted tray cover assembly in accordance with another embodiment of the present invention.

Turning to FIG. 12, the assembly 100 further includes a panel 1200 located within the roll bar 800. The panel 1200 can be translucent or transparent (e.g. Perspex, plastic, etc.), or metal. The assembly 100 further includes a static U-shaped tail frame 1202 for mounting to a tail of the tray/cargo area 102 of the ute/pickup 104.

Figure 13:
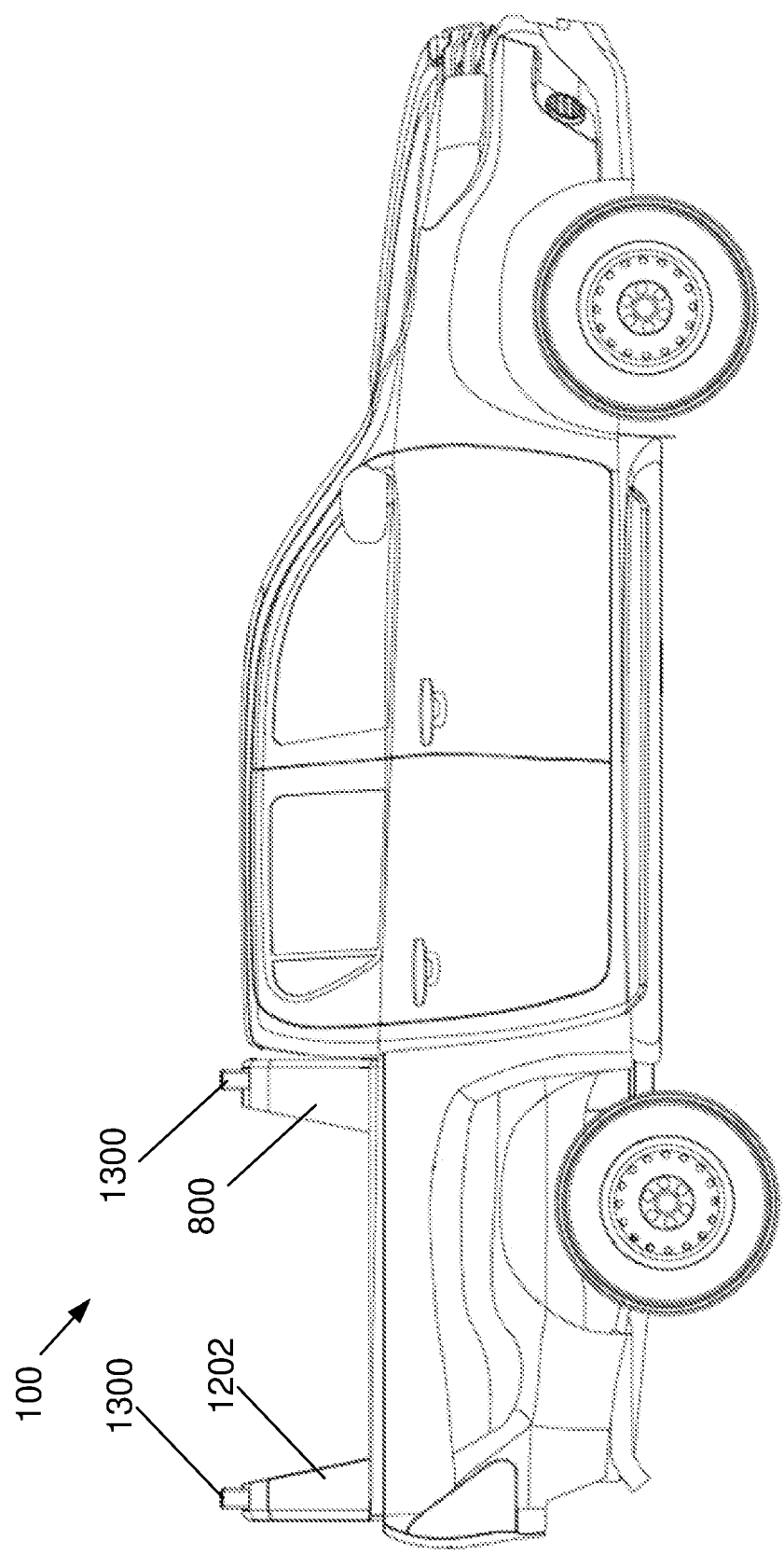
FIG. 13 is a side view of the ute/pickup truck of FIG. 12.

Turning to FIG. 13, the assembly 100 further includes roof-racks 1300 for mounting to the roll bar 800 and tail frame 1202.

Figure 14:
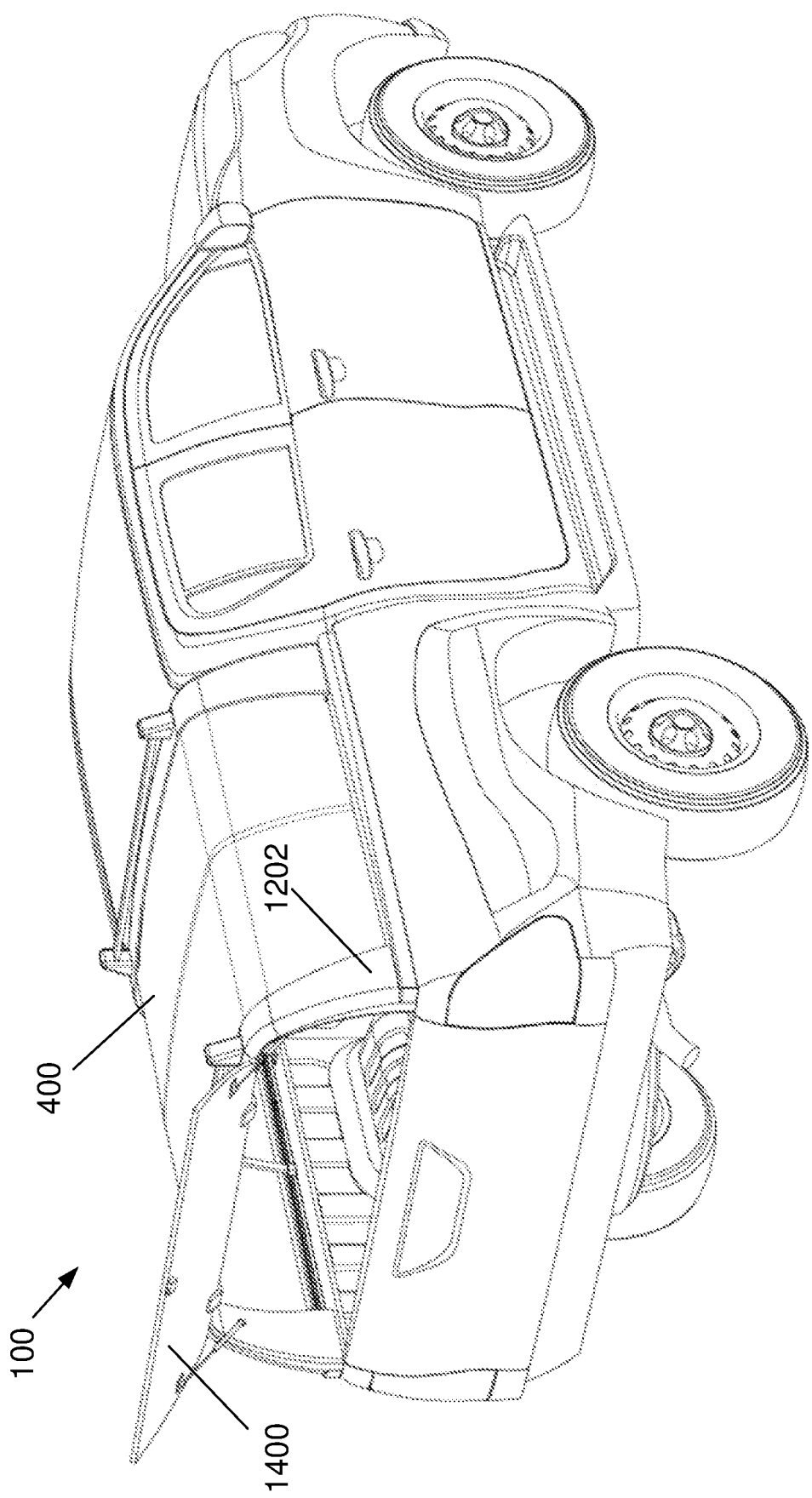
FIG. 14 is an upper perspective view of the fully extended tray/cargo cover assembly of FIG. 12 with a fixed enclosure closure fitted.
Figure 15:
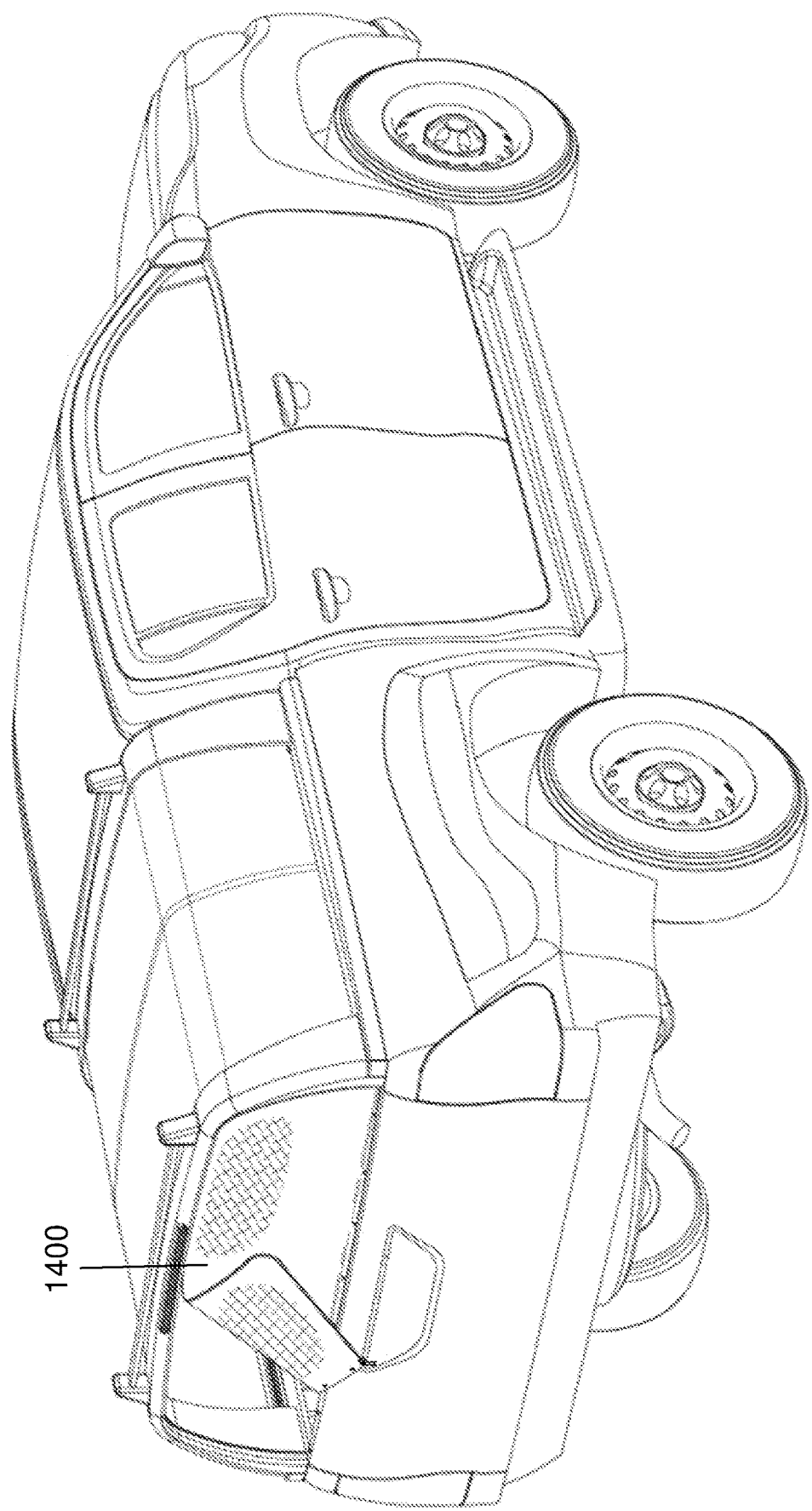
FIG. 15 is an upper perspective view of FIG. 14, with an alternative enclosure closure fitted.

Turning to FIG. 14, the assembly 100 includes a rear closure 1400 mounted to the tail frame 1202 and for closing the tray/cargo space beneath the extended cover 400. The closure 1400 includes a flip window, or a removable pliant panel as shown in FIG. 15. The closure 1400 may be translucent or transparent (e.g. Perspex, plastic, etc.).

Figure 16:
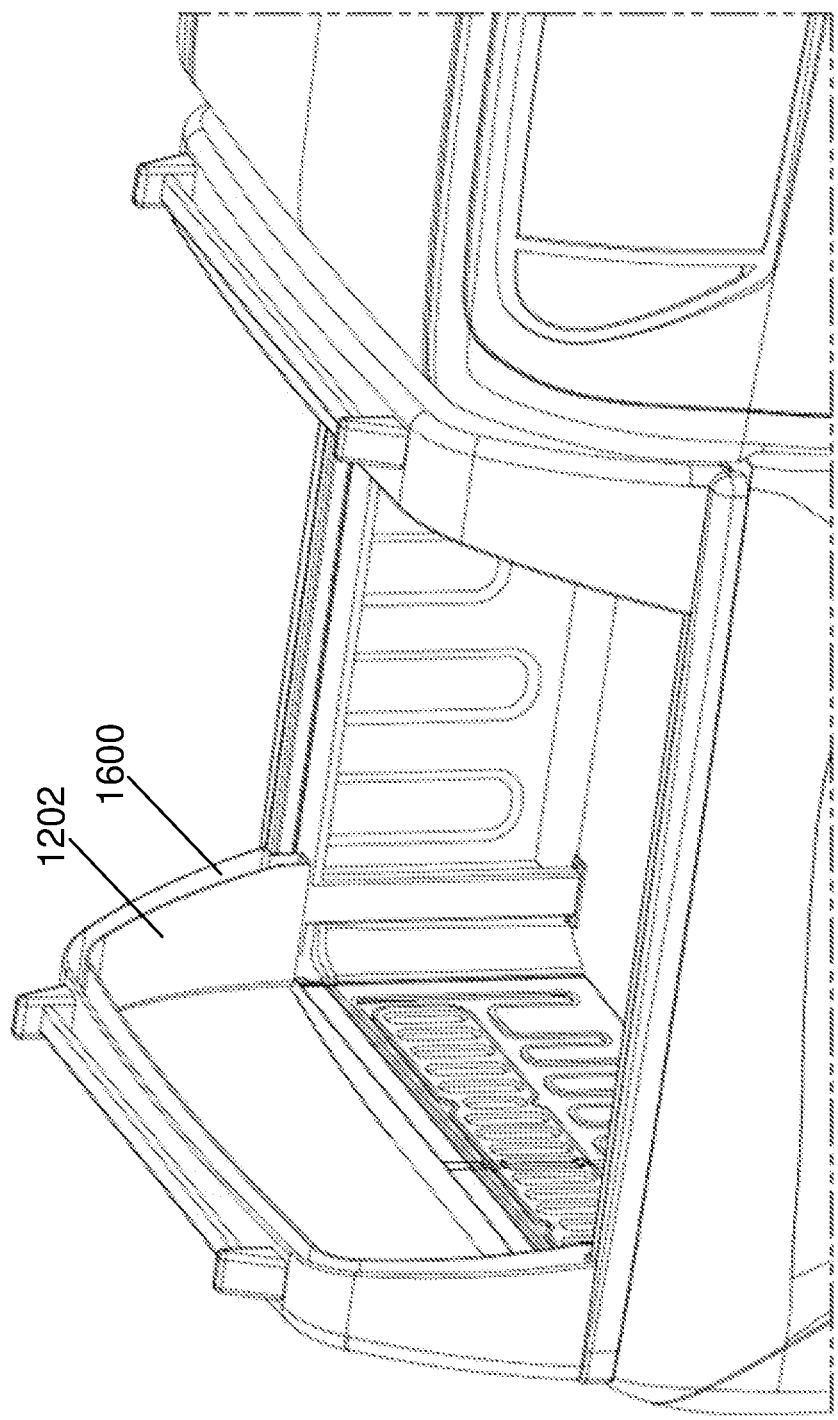
FIG. 16 is front perspective view of the retracted tray/cargo area cover assembly of FIG. 12.

Turning to FIG. 16, the tail frame 1202 has a recess 1600 to snugly receive a rearmost moving support 300.

Figure 17:
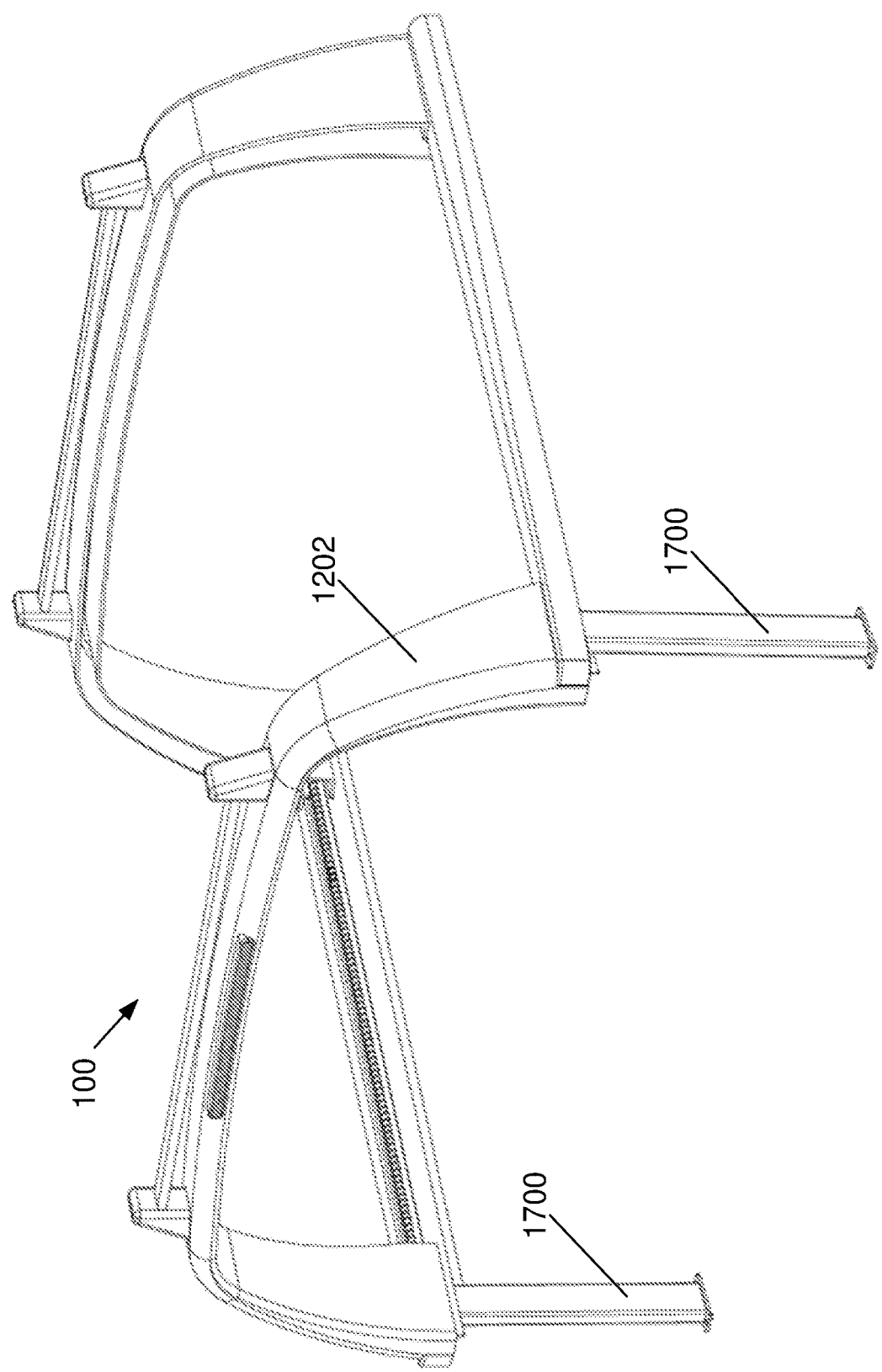
FIG. 17 is a rear perspective view of a retracted tray cover assembly showing the rear mounting arrangement.
Figure 18:
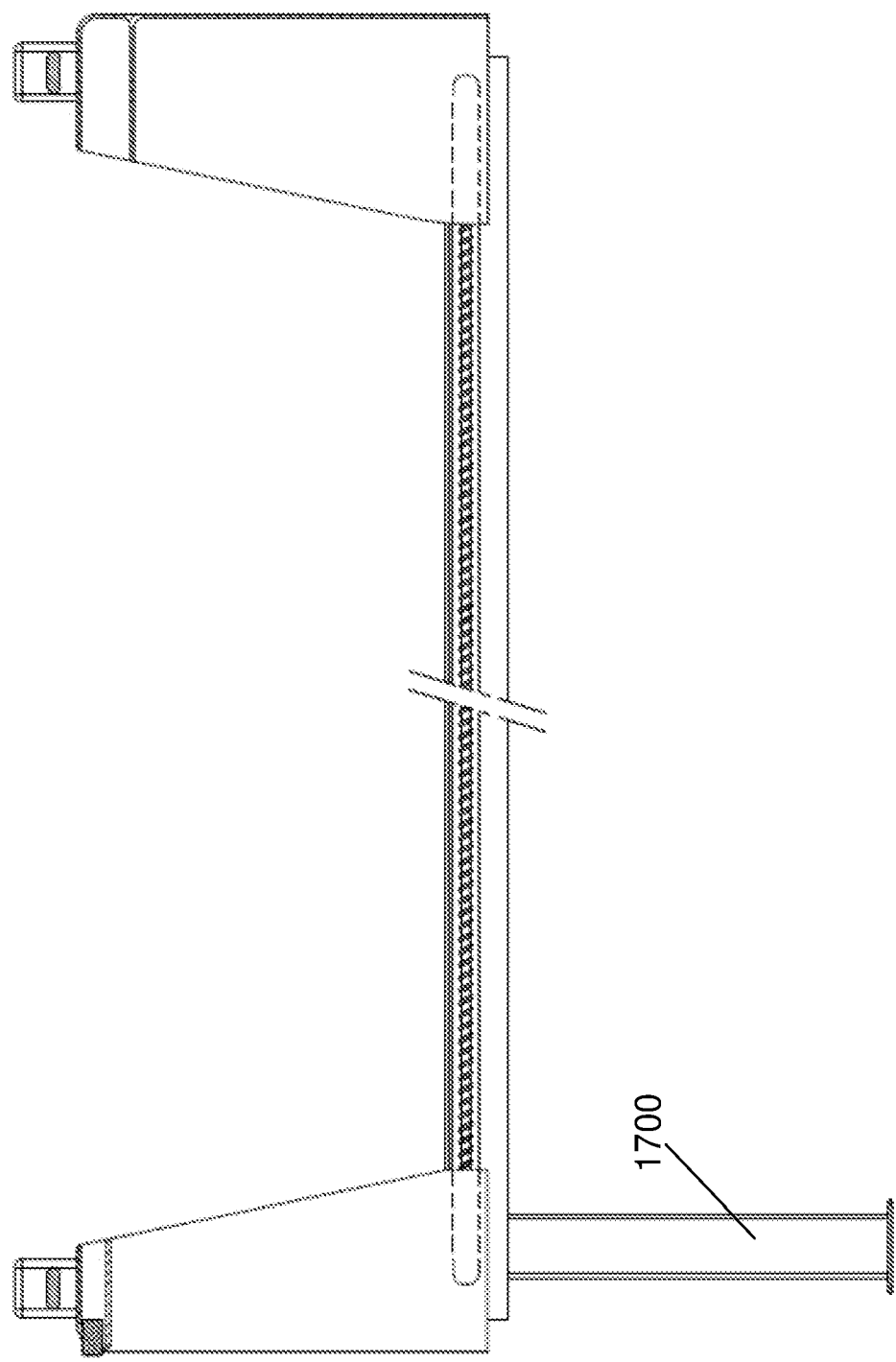
FIG. 18 is a side view of a retracted tray/cargo area cover assembly of FIG. 17.

Turning to FIGS. 17 and 18, the assembly 100 further includes two uprights 1700 for supporting the tail frame 1202, and that extend from a floor of the tray/cargo area 102 to which they are fastened.

The assembly 100 allows the tray space to be used as normal without impeding the ability to carry larger loads. When required, the cover 400 will extend to cover and protect the contents being carried. When not required the cover 400 will retract into the roll bar 800. The assembly 100 also has a considerable aesthetics advantage over all other covers as when it is not in use, the ute/pickup truck 104 still has its factory lines and custom roll bar.

Figure 19:
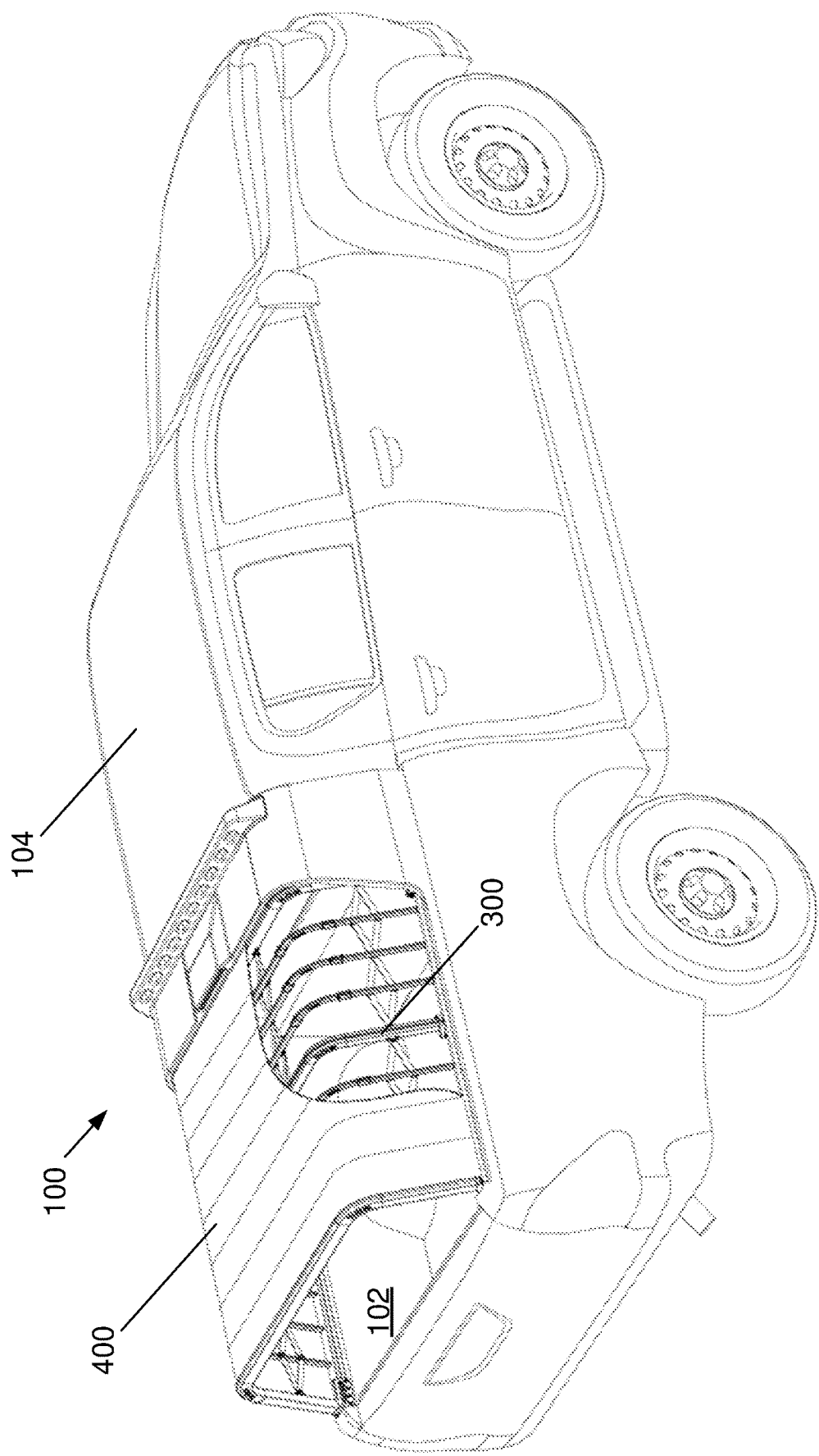
FIG. 19 is a partially sectioned rear perspective view of a ute/pickup truck retro-fitted with an expanded tray/cargo area cover assembly in accordance with another embodiment of the present invention.

According to another embodiment of the present invention, there is provided an automotive cargo or tray area cover assembly 100 as shown in FIG. 19.

The assembly 100 includes a retractable cover 400 for covering the cargo or tray area 102 of the ute/pickup truck 104. Once again, the U-shaped rib supports 300 are provided for moving over the cargo or tray area 102 and supporting the cover 400.

Figure 20:
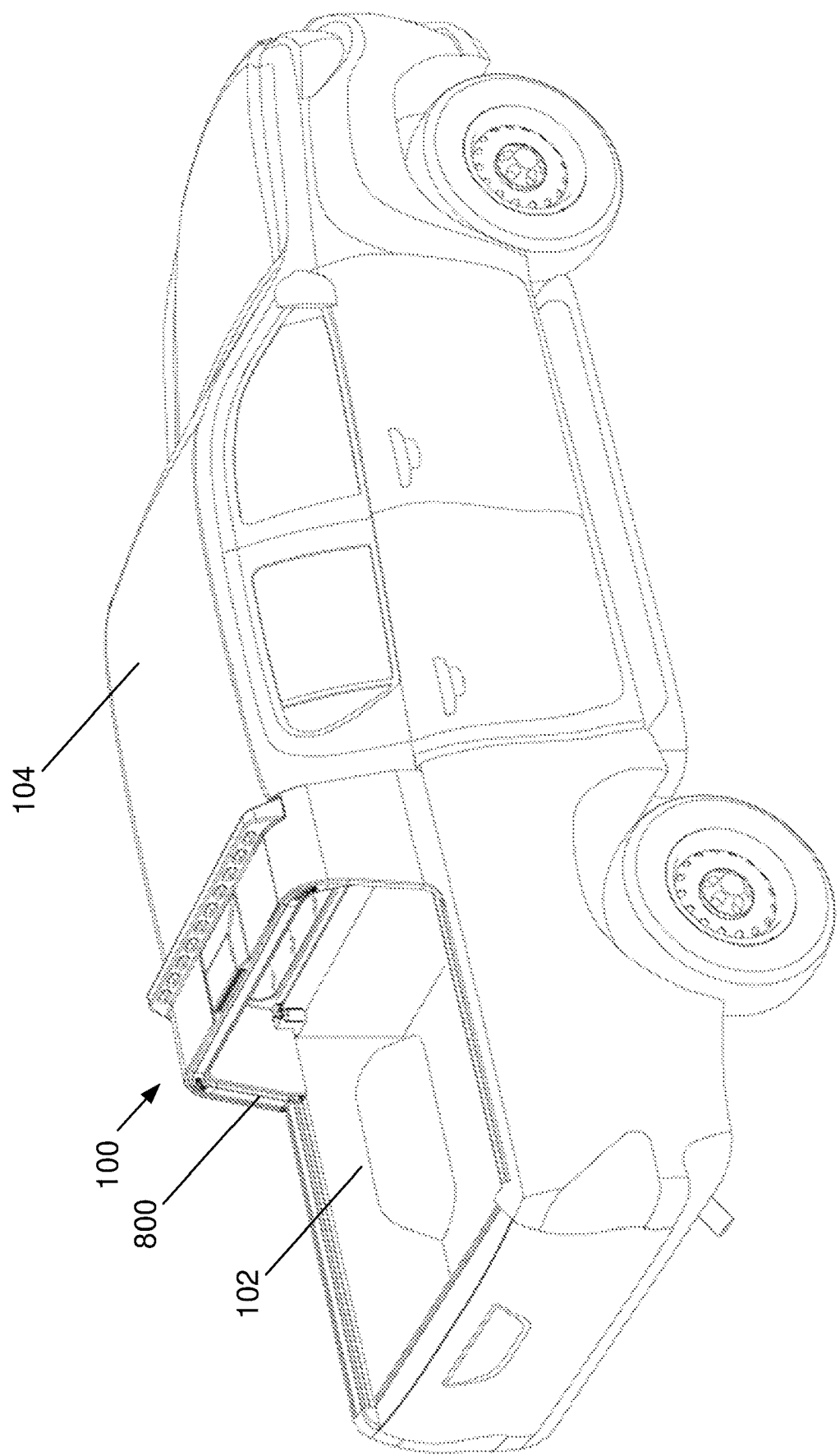
FIG. 20 is a rear perspective view of the ute/pickup truck of FIG. 19 with a retracted tray/cargo area cover assembly.
Figure 21:
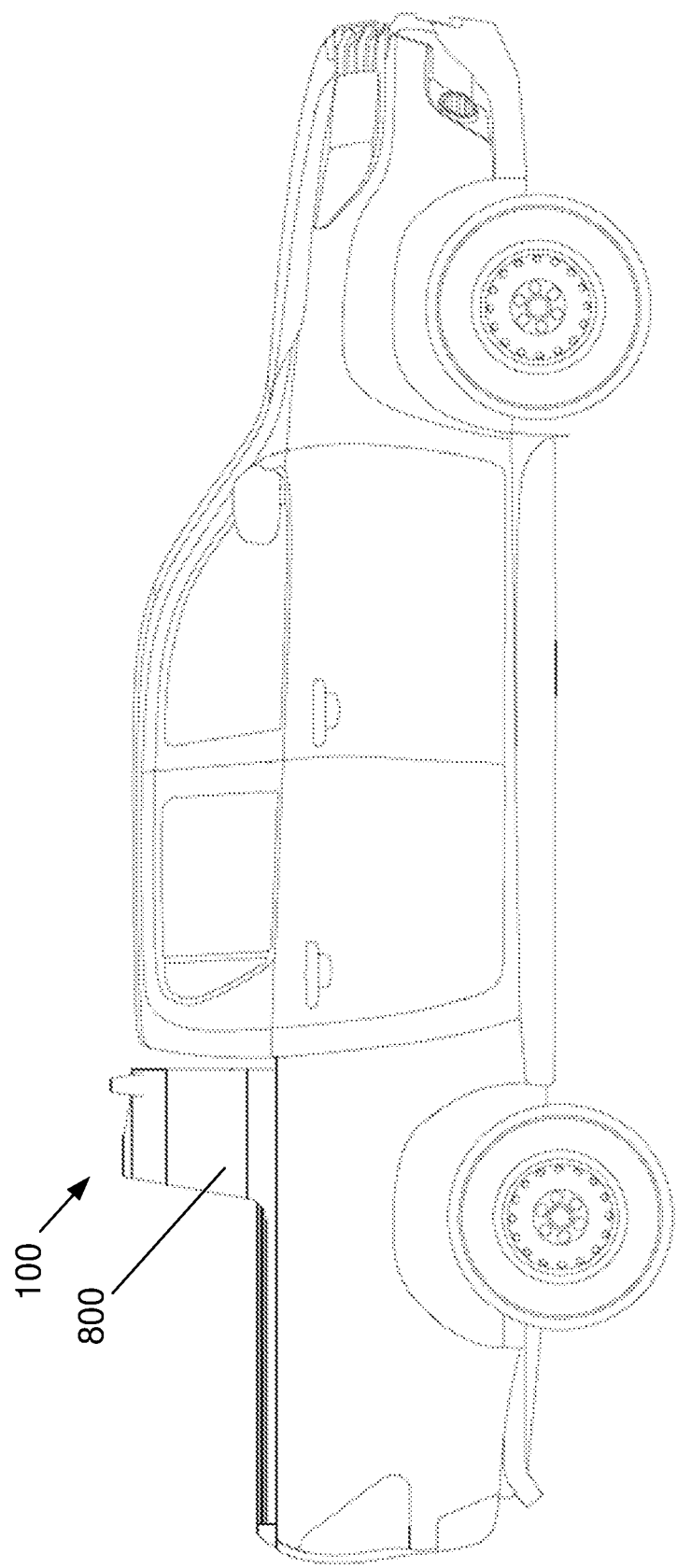
FIG. 21 is a side view of the ute/pickup truck of FIG. 20.

The cover 400 can be retracted in concertina fashion, and housed in the roll bar housing 800 as shown in FIGS. 20 and 21.

Figure 22:
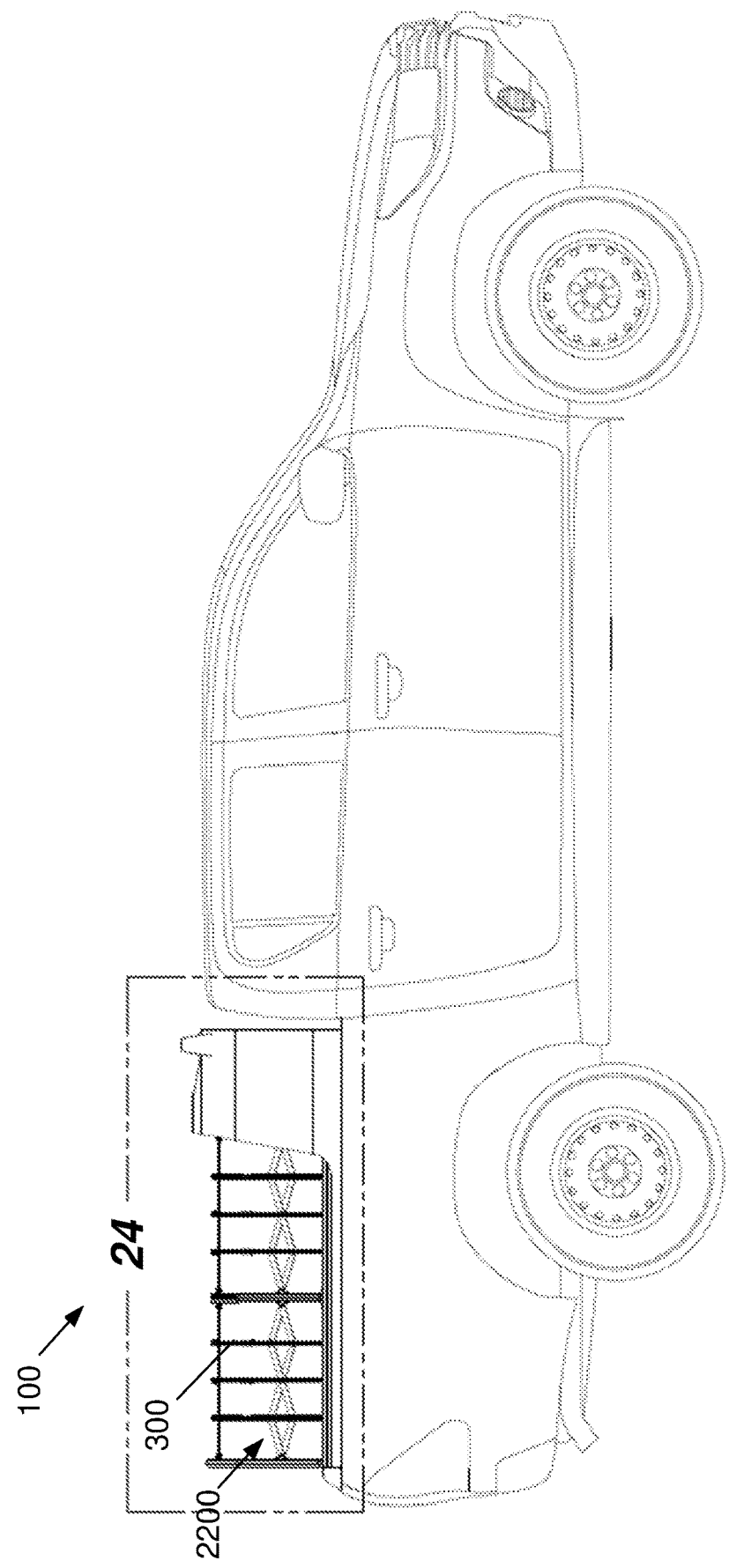
FIG. 22 is a side view of the ute/pickup truck of FIG. 21, with the cover removed and rib supports expanded.

Turning to FIG. 22, the cover assembly 100 further includes a scissor mechanism 2200 extending along the rib supports 300.

As shown in FIGS. 23 and 24 respectively, the scissor mechanism 2200 advantageously expands vertically during retraction of the cover 400 to support the loose cover 400, and narrows to support the tight and expanded cover 400.

As can best be seen in FIG. 24, the scissor mechanism 2200 includes extendable bar supports 2202. The rigid supports 2202 are pivotally mounted to the rib supports 300, and extend toward the horizontal as the assembly 100 is expanded.

Figure 25:
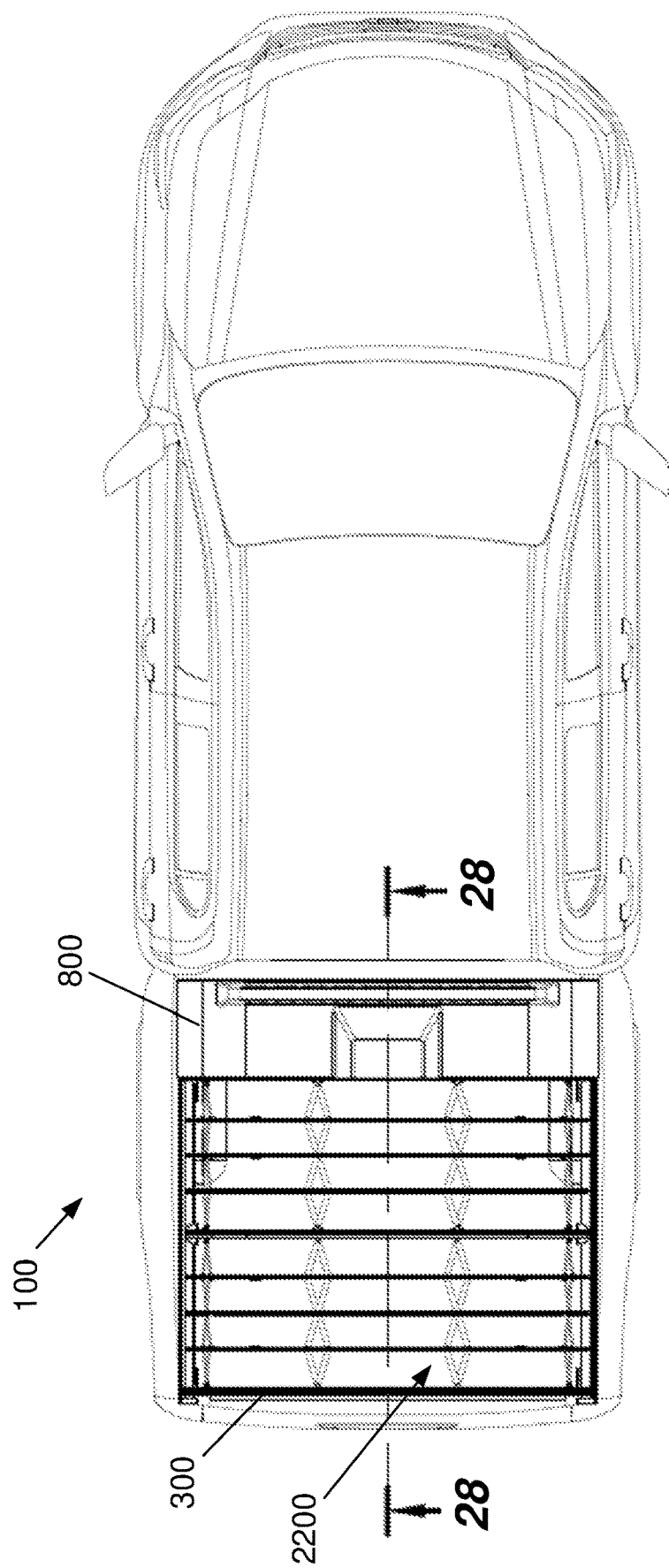
FIG. 25 is a plan view of the ute/pickup truck of FIG. 22.

FIG. 25 shows that the assembly 100 includes two roof scissor mechanisms 2200, as well as scissor mechanisms 2200 on either side of the assembly 100.

Figure 26:
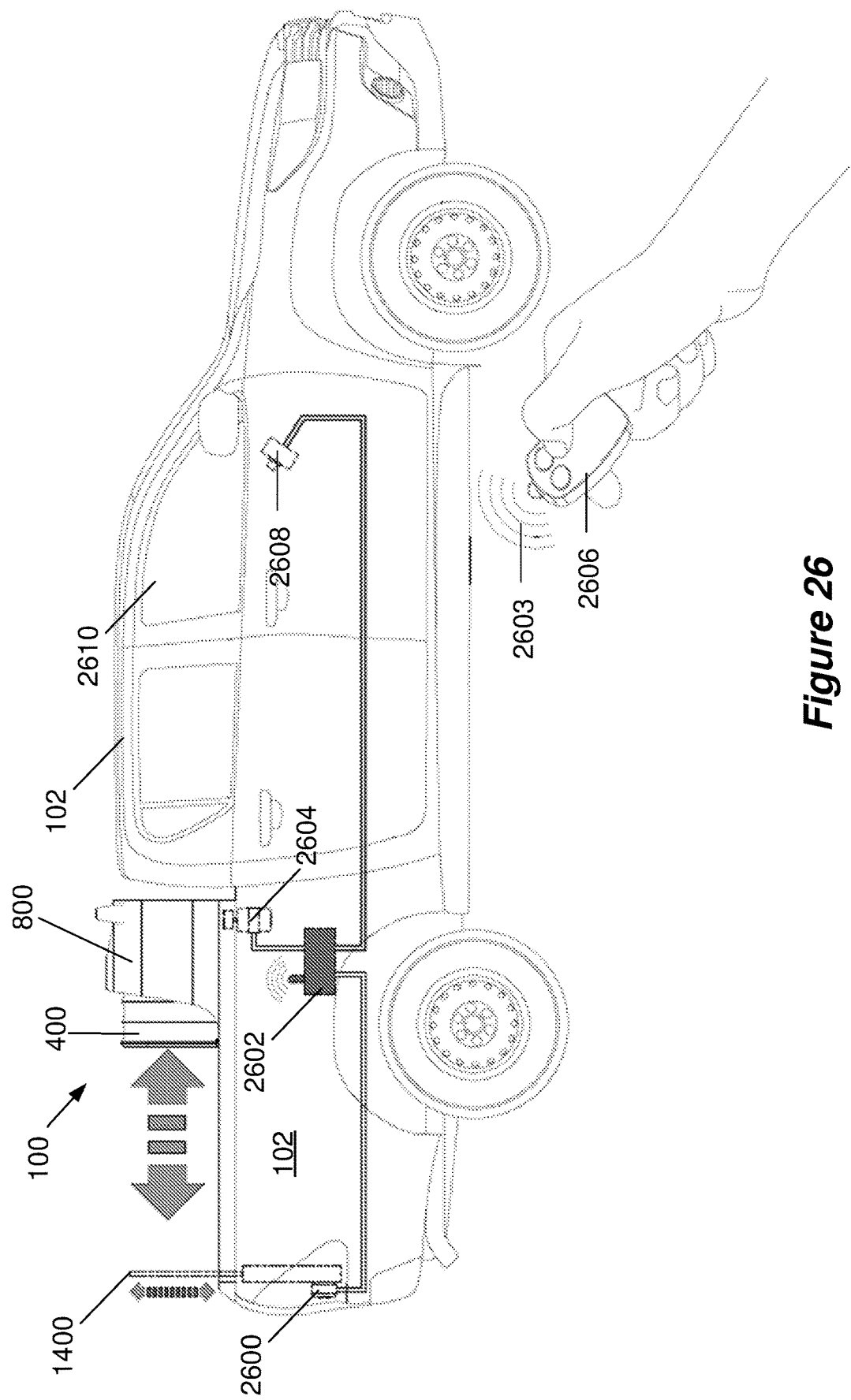
FIG. 26 is a schematic side view of the ute/pickup truck of FIG. 19 showing the controller for automation

Turing to FIG. 26, the cover assembly 100 further includes a rear closure 1400 in the form of an electric window (or door) with window motor 2600. The cover assembly 100 further includes a controller 2602 for receiving a control signal 2603. A motor arrangement 2604 is driven by the controller 2602 to move the cover 400 over the cargo or tray area 102. The controller 2602 also drives the window motor 2600 to move the window closure 1400 to close the rear of the cargo or tray area 102.

The control signal 2603 is wirelessly transmitted from either a remote control unit 2606, or received by the controller 2602 from a control unit 2608 in a cab 2610 of the vehicle 104. A driver in the cab 2610 can actuate the control unit 2608, to move the cover 400 to cover the cargo or tray area 102 and move the closure 1400 to close the tray area 102, whilst the vehicle 102 is moving which is particularly advantageous if it starts raining when driving. The remote control 2606 can be used to the same effect, when the driver is external the vehicle 104.

The control signal 2603 enables stop, start and reverse operations. The controller 2602 enables force control which stops the motors in the event of a jam, and will inhibit operation of the rear window closure 1400 if the cover assembly 100 is not fully extended.

Figure 27:
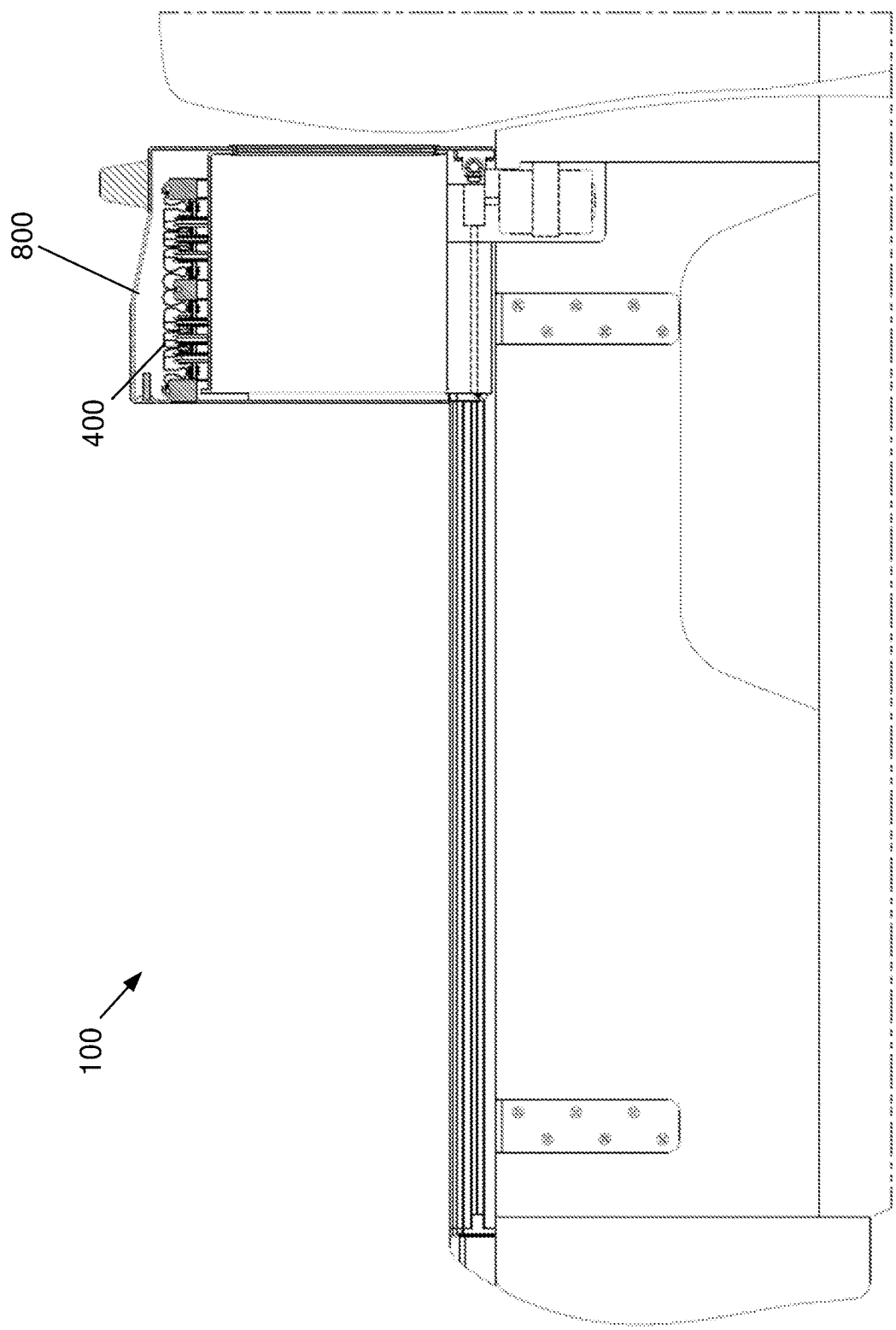
FIG. 27 is a side view of the ute/pickup truck of FIG. 19 showing the fully retracted cover.

FIG. 27 more clearly shows the cover 400 retracted, in a concertina fashion, and housed in the roll bar housing 800.

Figure 28:
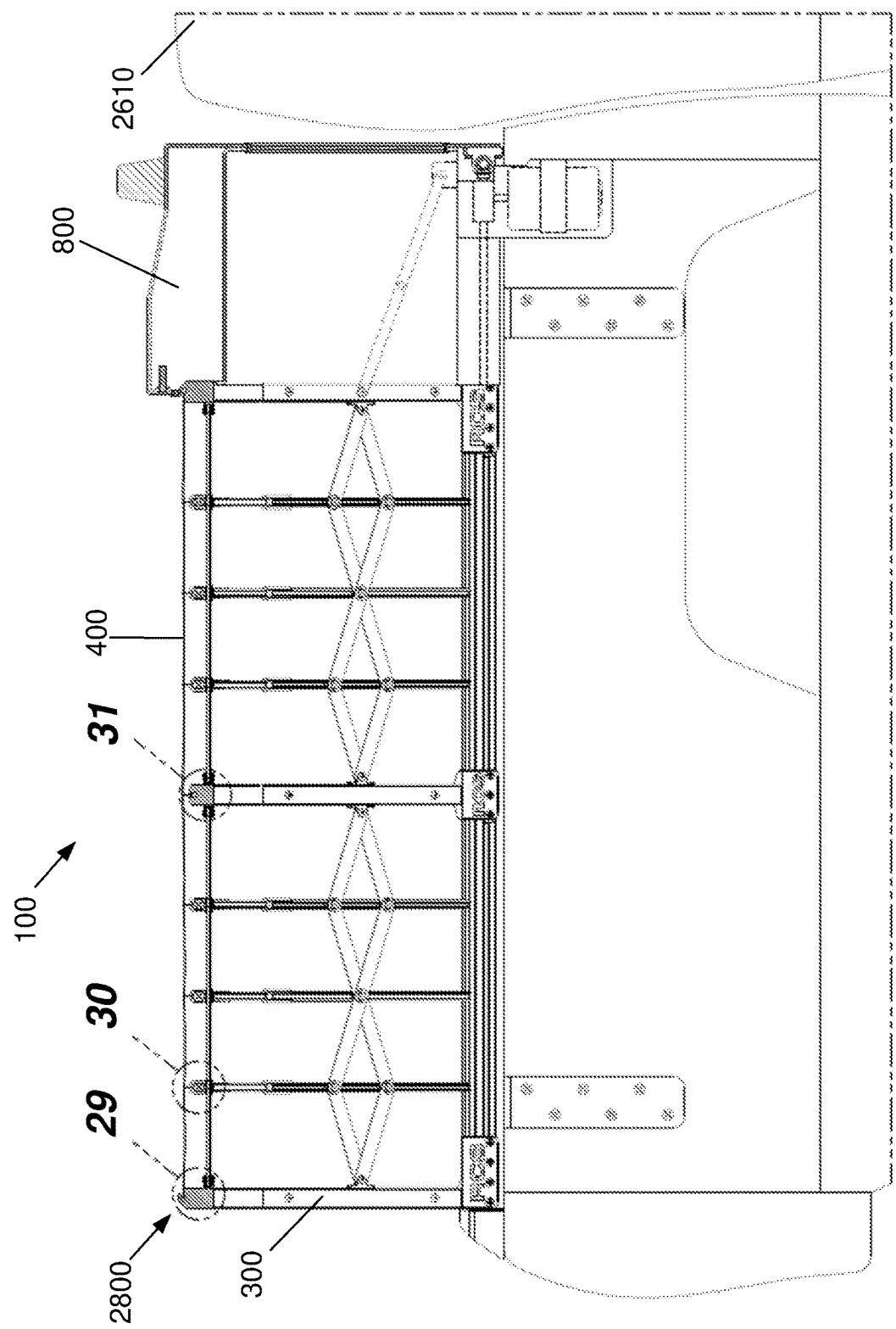
FIG. 28 is a side view of the ute/pickup truck through the section in FIG. 25.

FIG. 28 shows that the top of the cover 400 is releasably fastened with the rib supports 300 using a fastening arrangement 2800.

As can best be seen in the detail of FIGS. 29 to 31, the fastening arrangement 2800 includes a tongue-in-groove arrangement in the form of a Keder™ connection. The Keder connection includes the keder tongue 2902 which is typically resilient beading, cording, piping, welt or welting within the edge of the cover 400. The bulbous tongue 2902 is inserted in the groove 2904, typically by axially insertion or transverse press force fitting.

Turning to FIGS. 32 and 33, the base of the cover 400 is also releasably fastened with the guide rails 1000 which guide the supports 300 using the tongue-in-groove fastening arrangement 2800. The Keder tongue 2902 and cover 400 moves axially along the groove 2904 as the rib supports 300 move over the cargo or tray area 102. There are many such spaced apart tongues 2902, along the rail 1000, to facilitate concertinaing of the cover 400.

As can best be seen in FIG. 33, the assembly 100 is designed so that the cover 400 folds inwards toward the tray area 102 during retraction. Positioning the keder tongue 2902 lower than the outer side lip 3300 compels the canvas cover 400 to fold inwards. Further, the oblique sides of the rib supports 300 extend up inwardly over the tray area 102, forming an angle of about 72 degrees with the horizontal. The angle from horizontal of the inwardly slanting roof 3302 of the on the guide rail 1000 is about 18 degrees. The two angles together make 90 degrees to successfully fold the canvas cover 400 inwards.

Returning momentarily to FIG. 28, the cover assembly 100 further includes the housing 800 adjacent the cab 2610 of the vehicle 104 for housing the retracted cover 400.

Neither the cover 400 nor the rib supports 300 are attached to the housing 800. The housing 800 also has a fitted brake light.

FIG. 33 also shows that an anti-jam gap 3304 is defined beneath the foot 1002 of the rib support 300 and the rail 1000. In this regard, the rail 1000 defines a resting lip 3306 for supporting one side of the foot 1002, and a bulbous track 3308 forming a complementary sliding fit with the other side of the foot 1002. Accordingly, the foot 1002 slides over any small debris in the gap 3304, without jamming.

The underside of the rail 1000 also defines a T-shaped channel 3310 along which a bolt head can be suitably positioned during retro-fitting of the assembly 100 to the vehicle 104.

Figure 34:
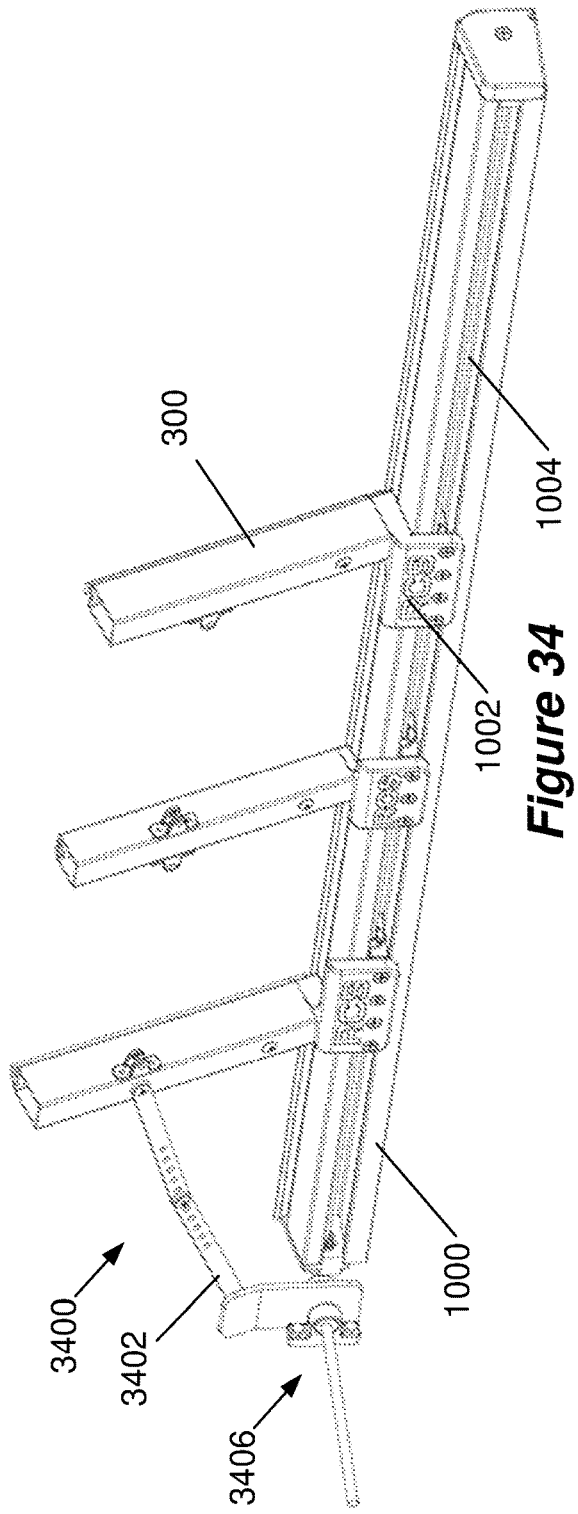
FIG. 34 is a perspective view of the rail assembly of FIG. 32.
Figure 35:
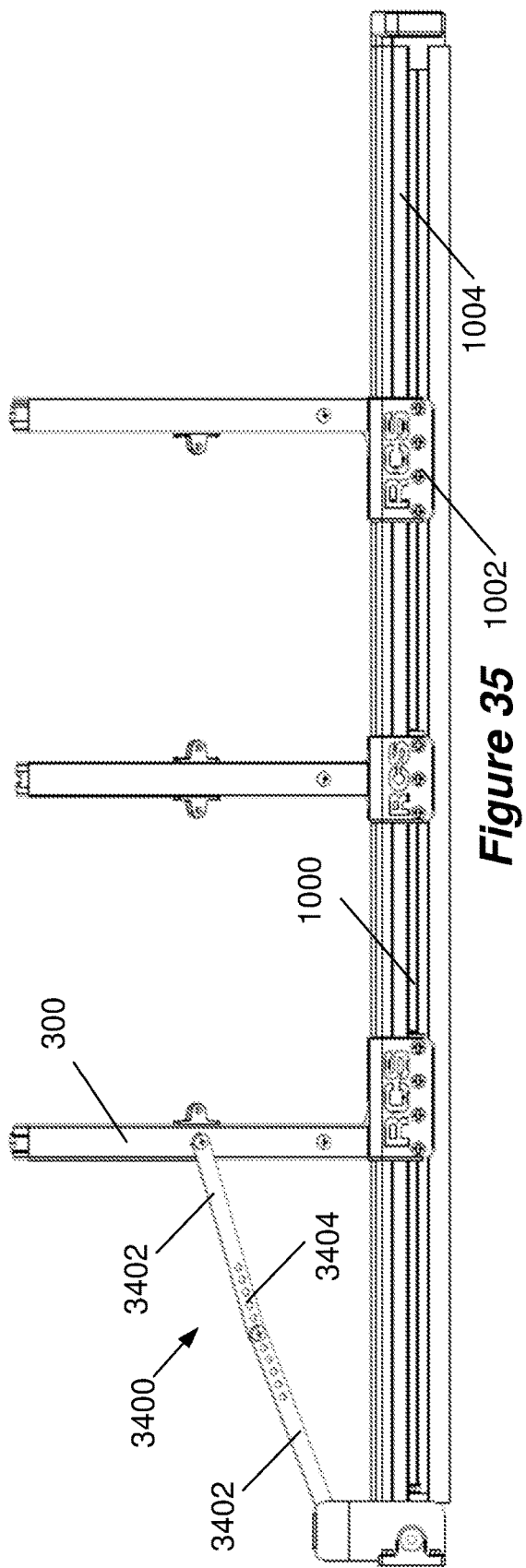
FIG. 35 is a side view of the rail assembly of FIG. 34.

Instead, as shown in FIGS. 34 and 35, the cover assembly 100 further includes an anchor 3400 for anchoring an endmost rib support 300 along the cargo or tray area 102. The anchor 3400 includes a pair of rods 3402, pivotally mounted at the ends and common centre. Each rod has adjustment holes 3404 so that the anchor 3400 is adjustable to accommodate for different length cargo or tray areas 102, by setting the fixed location of the endmost rib support 300 within the housing 800. The rods 3402 are pivotally mounted to each other with a nut-and-bolt about a suitable adjustment hole 3404. The rods 3402 can pivot so that the overall length is extended and retracted.

As above, the cover assembly 100 includes a linear actuator 3406, with elongate screws 1004, for linearly driving the engaged foot 1002 of a leading rib support 300 toward the back of the vehicle 104 when covering the cargo or tray area 102. The remaining rib supports 300 are not engaged with the screw 1004, and follow by being pulled along the guide rail 1000 by the expanding cover 400. The final follower rib support 300 elongates the anchor bars 3402. Similarly, during retraction of the cover 400, the driven rib support 300 at the back of the vehicle 104 serially pushes the remaining passive rib supports 300 together and finally retracts the anchor bars 3402.

Figure 37:
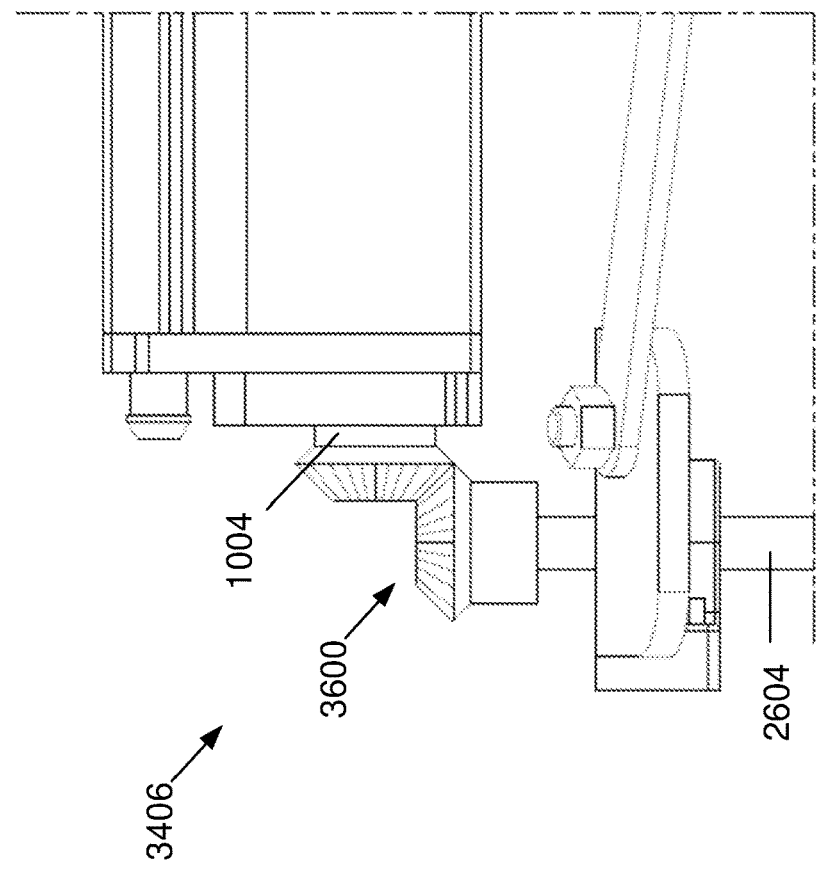
FIG. 37 is a plan view of the drive arrangement of FIG. 36.
Figure 36:
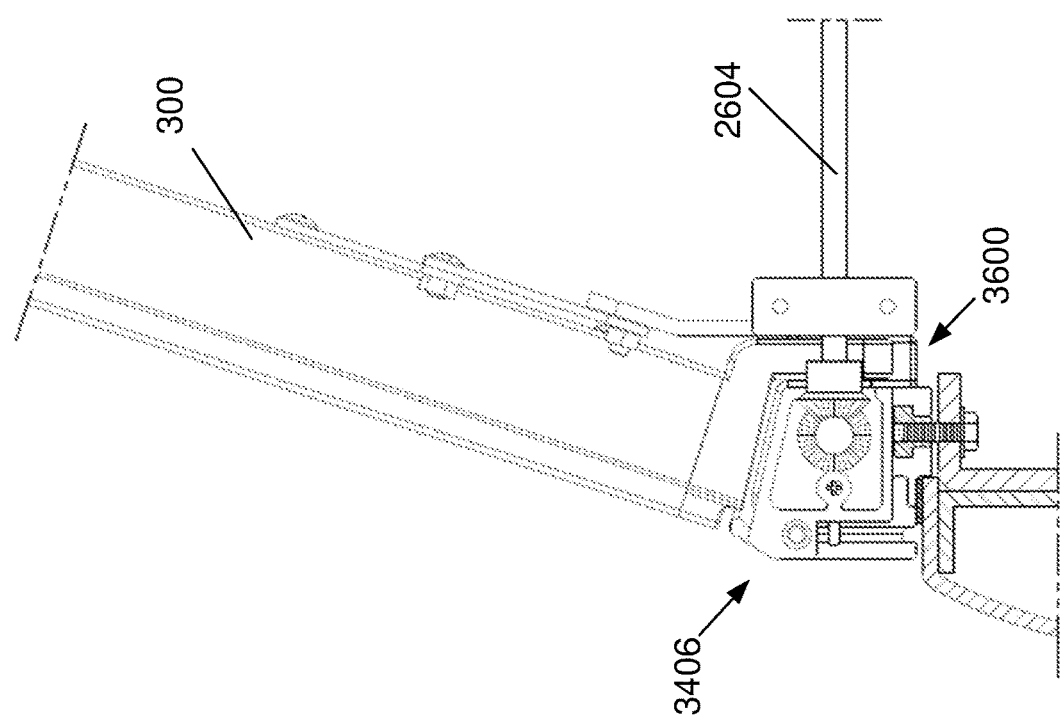
FIG. 36 is an end view of the rail assembly of FIG. 32 showing the drive arrangement for the cover assembly.

Turning to FIGS. 36 and 37, the linear actuator 3406 includes the elongate screw 1004 with which the leading rib support 300 is engaged, a bevel screw arrangement 3600 for driving the elongate screw 1004, and a shaft of the motor 2604 (see also FIG. 26) for driving the bevel screw arrangement 3600.

FIGS. 38 to 40 show the guide rail arrangement in greater detail. The sliding foot 1002 has no bearings.

Figure 41:
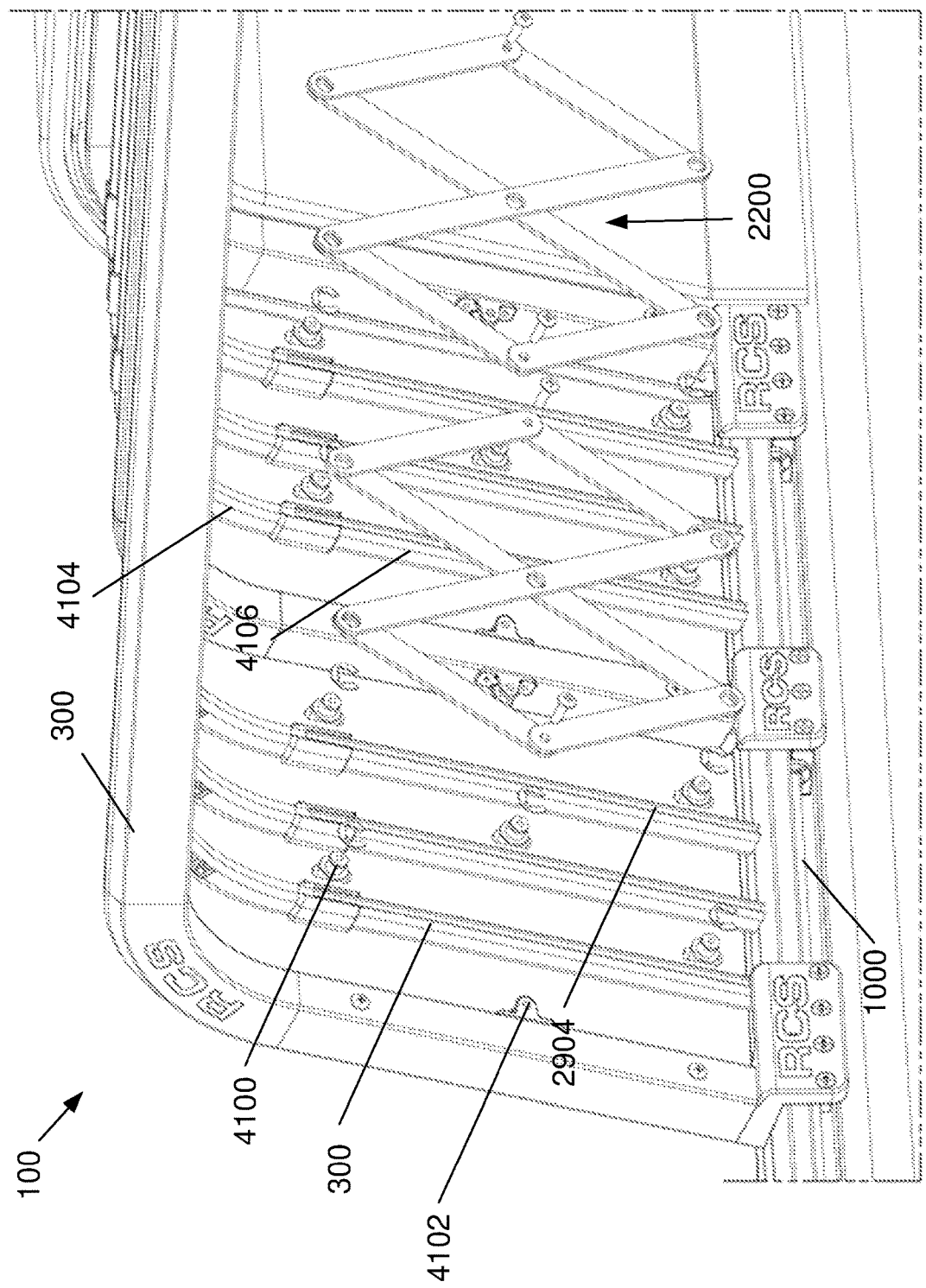
FIG. 41 is a partially exploded view of the cover assembly showing the scissor support.

FIG. 41 clearly shows the pivotal mounting of the scissor mechanism 2200 along the rib supports 300. Some of the intervening minor rib supports 300 are floating and facilitate compaction, and are not fitted within the guide rails 1000 like the other major structural rib supports 300. The use of ribs 300 provides for controlled folding of the cover 400 into smaller portions there-between and improved compactness.

The minor rib supports 300 define grooves 2904 in which pivots 4100 with complementary tongues 2902 at their base are located. Accordingly, the pivots 4100 can slide up and down along the minor rib supports 300 as the scissor mechanism 2200 is expanded and contracted horizontally along the guide rails 1000. The scissor mechanism 2200 is fastened to the major structural rib supports 300 at a fixed pivot position 4102.

The minor rib supports 300 include corner parts 4104, that mate with straight parts 4106.

Figure 43:
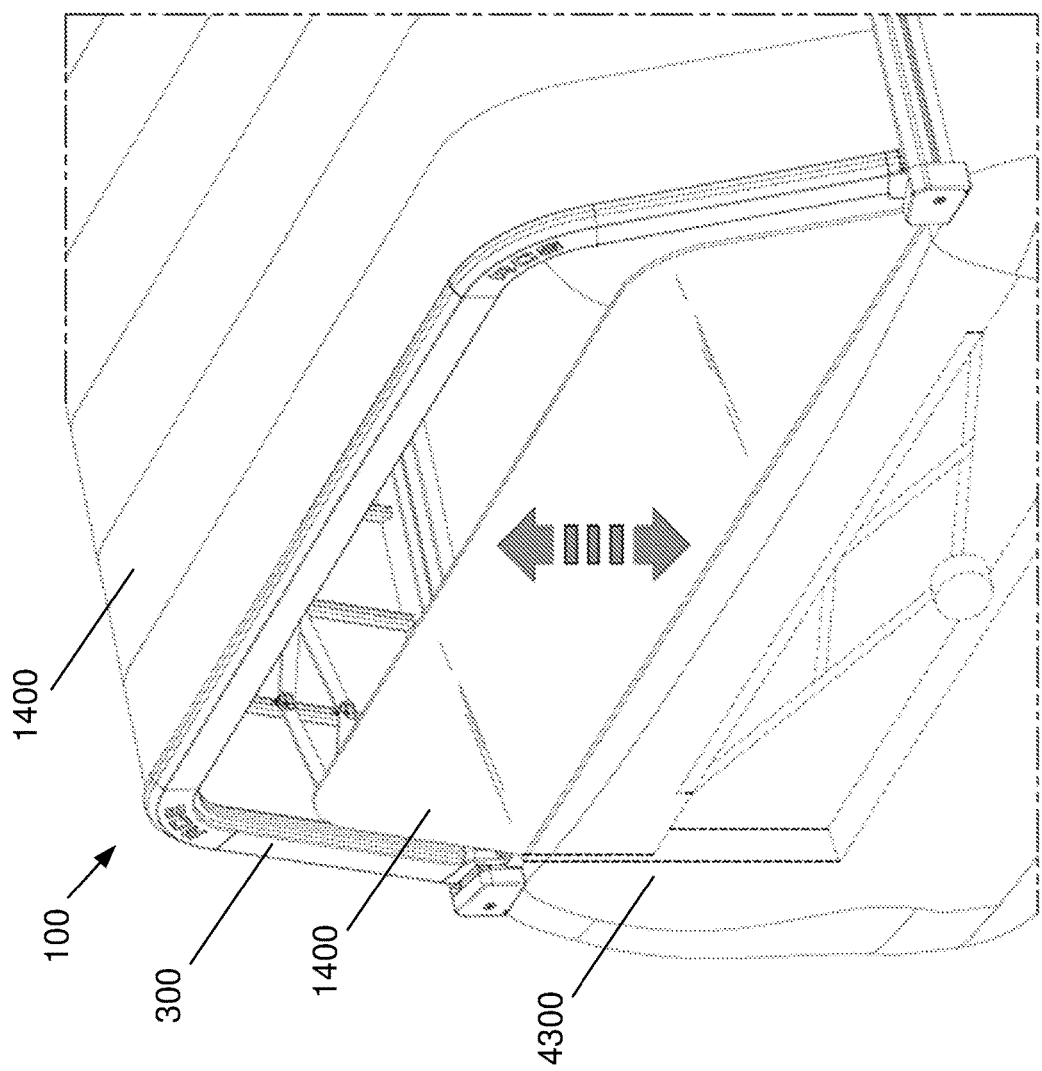
FIG. 43 shows a rear electric window closure of the cover assembly of FIG. 42.
Figure 42:
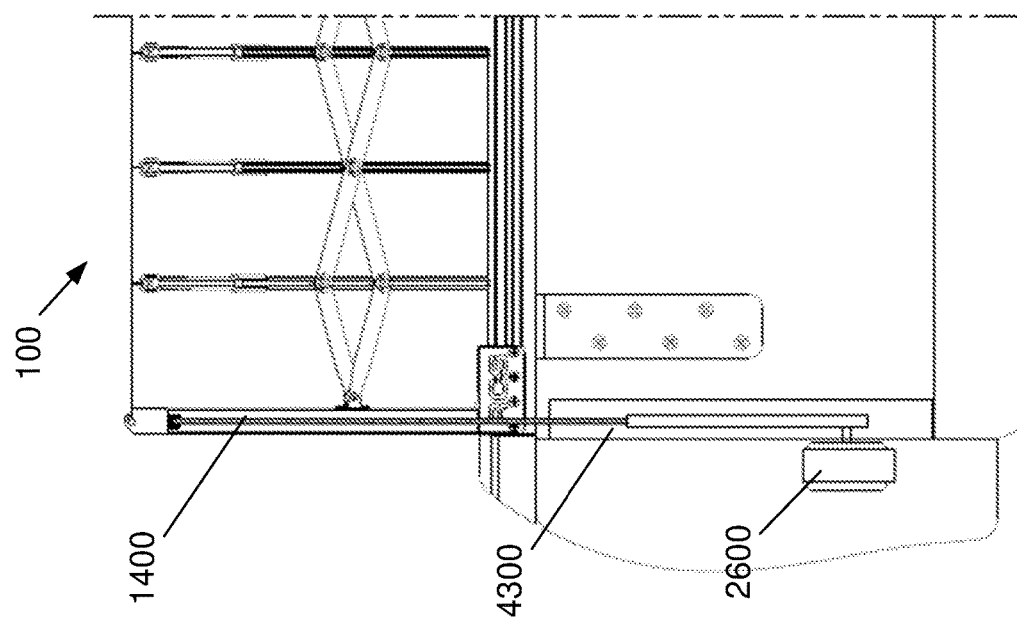
FIG. 42 is a close up side view of a rear of the cover assembly of FIG. 41.
Figure 44:
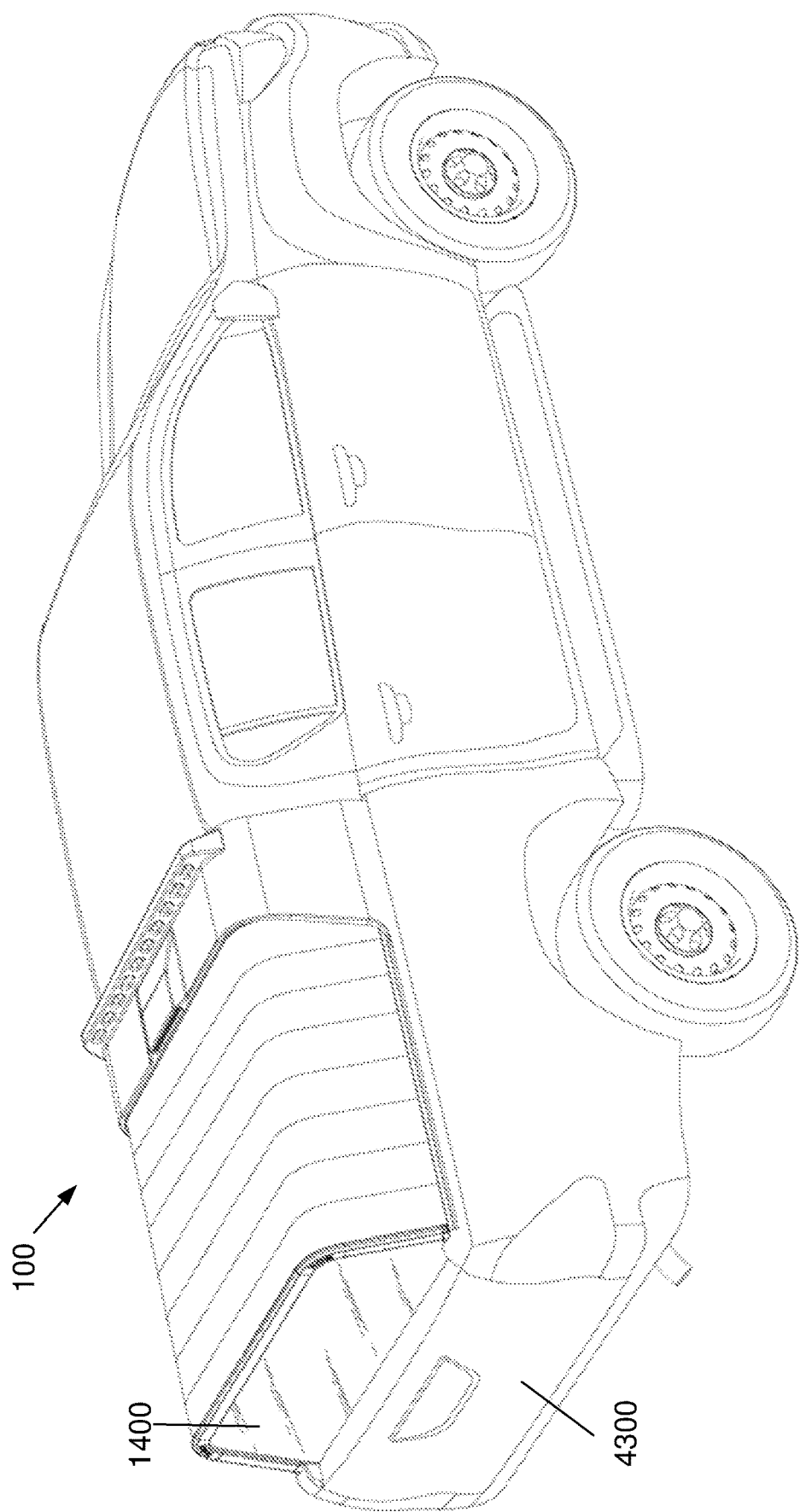
FIG. 44 is a rear perspective view of the ute/pickup with the cover assembly of FIG. 43.

FIGS. 42 to 44 show that the window closure 1400 forms a tight seal with the endmost rib support 300 or the cover 400. The window closure 1400 extends up from a lower rear end flap 4300 of the vehicle 104.

Figure 45:
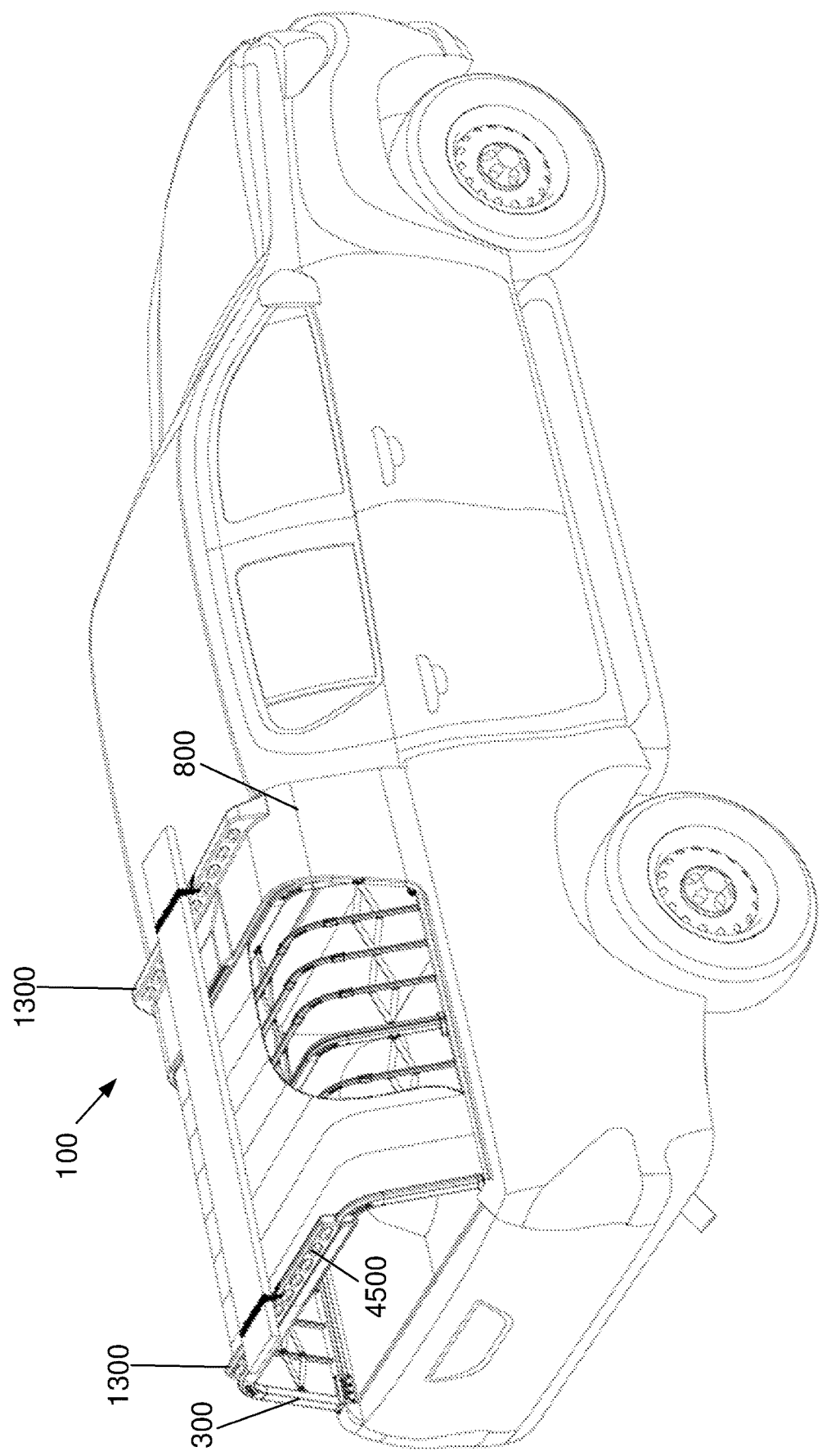
FIG. 45 is a rear perspective view of the ute/pickup truck of FIG. 19 with roof racks.

FIG. 45 shows that roof-racks 1300 can be mounted to the roll bar housing 800 and rear endmost rib support 300. The roof racks 1300 can have an integrated tail light panel 4500.

Figure 47:
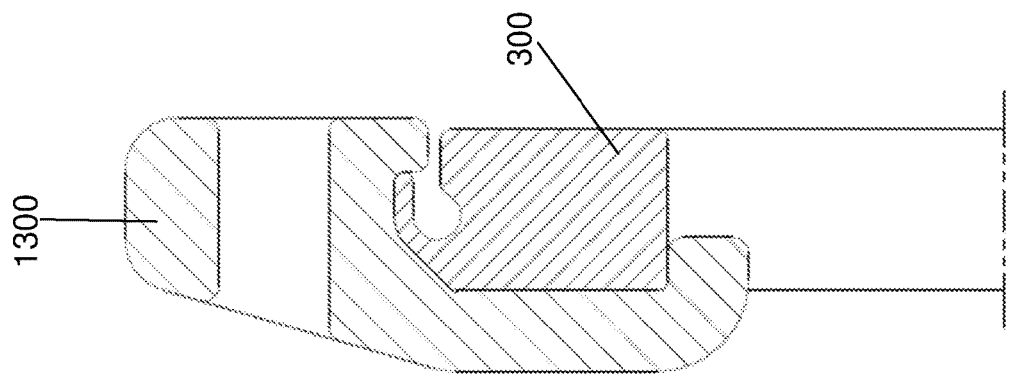
FIGS. 46 and 47 are end sectional views showing fitting of the roof racks of FIG. 45.
Figure 46:
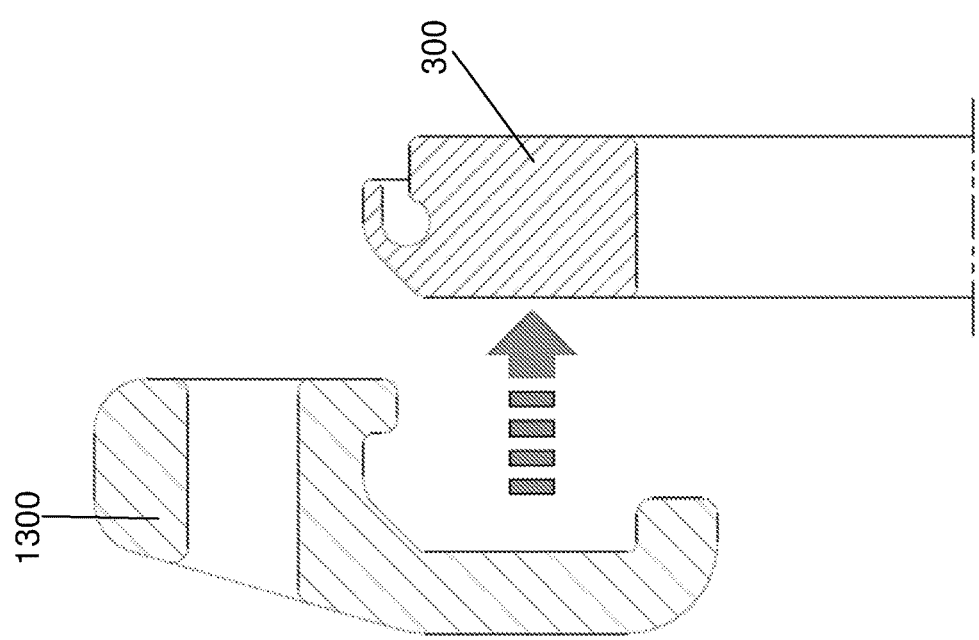

As shown in FIGS. 46 and 47, the rib support 300 can nest within the roof rack 1300 which is clicked onto it.

The assembly 100 is better than manually operated prior art systems because it enables full automation with the press of a button (FIG. 26).

The assembly 100 also enables full use of the tray area 102 as it is fitted to the sides (FIG. 20), whereas prior art assemblies result in a loss of up to 25-30% of the tray area. The tailgate fitted rear window closure 1400 (FIGS. 42-43) maximises space in the tray area 102. The controlled folding of the canvas cover 400 shown in FIG. 27 also ensures no more space is occupied than known roll bar designs.

Whilst the prior art does have windows, the windows provide an obstruction resulting in a loss of tray space 102 when loads taller than the tray sides are placed, the rear window cannot pass over it voiding the ability to be automated. Advantageously, the rear window closure 1400 (FIGS. 42-43) rises vertically up from the vehicle tailgate and meets the rib 300 or cover 400 creating an assembly 100 seal.

The assembly 100 can be operated whilst the vehicle 104 is in motion. The scissor mechanisms 200 work with the floating rib supports 300 to control the canvas cover 400 at all times, so it cannot be taken by the wind, flap around or fall into the wrong place and jam (FIG. 41). This complete control allows folding of the canvas cover 400 into a 50 mm space beneath the housing 800 to keep the manufacturer aesthetics intact (FIG. 21).

At no time is the driver's rearward view obstructed with the assembly 100, compared with some prior art where the canvas cover 400 simply falls down in practice and blocks rearward vision. In the present case, the driver can see unobstructed straight through the rear cab window of the vehicle, beneath the housing 800 and rib supports 300, and through the rear closure 1400.

The controller 2606 is able to stop and hold the extending or retracting assembly 100 in any position, with no need for pins or clamps (FIG. 26). The linear actuator 3406 with dual ball screws 1004 coupled to a single motor gearbox 2604 design gives great mechanical advantage.

The assembly 100 is not attached to the vehicle cab 2610 (FIG. 28), and is tray mount only and is adjustable with anchor 3400 (FIG. 34) so one cover assembly 100 fits multiple vehicles. This allows the owner to transfer the assembly 100 to another vehicle if it is sold.

The use of the Keder fastening arrangement 2800 (see FIGS. 29 to 33), with flexible pvc 2902 sewn into the canvas cover 400 to capture it at all times on every cover edge is advantageous over the prior art. This design allows movement when the canvas cover 400 is folding and then provides an attachment/anchor point for when the canvas cover 400 extended and tensioned. The design and use of this fastening arrangement 2800 greatly facilitates automation, provides an effective seal when the cover 400 is tensioned, and avoids the need for known zips, clips and straps all requiring manual handling.

The Keder fastening arrangement 2800 combined with the scissor mechanisms 2200 and rib supports 300 fitted to the guide rails 1000 provide a high level of security that prior art does not. The canvas cover 400 is captured in a recessed groove 2904, and the only way an intruder could access the closed tray area 102 would be to cut the canvas cover 400 and then navigate between the rigid scissor mechanisms 2200 and rib supports 300.

The use of no bearings in the drive blocks, and ball screw will give longevity to the assembly 100. It only takes 45 seconds to fully cover the tray 102. If rain falls, the tray area 102 is covered quickly with no manual handling required, and no need to leave the vehicle 104 to operate.

A person skilled in the art will appreciate that many embodiments and variations can be made without departing from the ambit of the present invention.

Alternatively, or additionally, the cover 400 can be manually extended and retracted using a handle coupled to the linear ball screws 1004, or simply by hand.

In one embodiment, linear actuators operate a scissor arrangement attached to each support 300 serially moving the cover 400 in an even motion until the cover 400 is taught.

In one embodiment, the ute/pickup 102 is manufactured with the tray cover assembly 100.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. An automotive cargo or tray area cover assembly including:
    a cover for covering a cargo or tray area of an automobile;
    rib supports for translation over the cargo or tray area and supporting the cover, each rib support including upright legs for elevating the cover above the cargo or tray area;
    wherein the cover is fastened with fastening arrangements on the rib supports, each fastening arrangement including a tongue-in-groove arrangement extending along the rib support and over the cargo or tray area, each tongue-in-groove arrangement including a bulbous tongue received in a complementarily-shaped groove; and
    a pair of guide rails located on opposite sides of the cargo or tray area for guiding said translation of the rib supports, wherein the cover is fastened to the rails using another fastening arrangement, said another fastening arrangement including another tongue-in-groove arrangement.

2. An automotive cargo or tray cover assembly as claimed in claim 1, further including extendable supports extending along the rib supports.

3. An automotive cargo or tray cover assembly as claimed in claim 2, wherein the extendable supports are pivotable about pivots, with at least some of the pivots able to move along the rib supports.

4. An automotive cargo or tray cover assembly as claimed in claim 2, wherein the extendable supports form a scissor mechanism.

5. An automotive cargo or tray cover assembly as claimed in claim 1, further including a rear closure having an electric window or door.

6. An automotive cargo or tray cover assembly as claimed in claim 1, wherein the rib supports include a plurality of moving rib supports.

7. An automotive cargo or tray cover assembly as claimed in claim 1, further including an anti-jam gap being defined beneath the rib supports.

8. An automotive cargo or tray cover assembly as claimed in claim 1, wherein the other tongue-in-groove arrangement includes at least one tongue for moving axially along an elongate groove as the rib supports move over the cargo or tray area.

9. An automotive cargo or tray cover assembly as claimed in claim 8, wherein the at least one tongue includes spaced apart tongues.

10. An automotive cargo or tray cover assembly as claimed in claim 1, further including a linear actuator for linearly moving a leading rib support when covering the cargo or tray area, with the remaining rib supports following by pulling.

11. An automotive cargo or tray cover assembly as claimed in claim 10, wherein the linear actuator includes an elongate screw with which the leading rib support is engaged, a bevel screw arrangement for driving the elongate screw, and a motor for driving the bevel screw arrangement.

12. An automotive cargo or tray cover assembly as claimed in claim 1, further including a controller for receiving a control signal, and a motor arrangement driven by the controller to move the cover over the cargo or tray area or move a closure to close the cargo or tray area.

13. An automotive cargo or tray cover assembly as claimed in claim 12, wherein the control signal is wirelessly transmitted from a remote control unit, or received from a control unit in a cab of the vehicle.

14. An automotive cargo or tray cover assembly as claimed in claim 1, wherein the cover can be moved to covering the cargo or tray area whilst the automobile is moving.

15. An automotive cargo or tray cover assembly as claimed in claim 1, further including a housing adjacent a cab of the automobile for housing the retracted cover, wherein the cover is not attached to the housing.

16. An automotive cargo or tray cover assembly as claimed in claim 1, further including:
    an anchor for anchoring an endmost one of the rib supports along the cargo or tray area, the anchor being adjustable to accommodate for different length cargo or tray areas;
    a light panel; and/or
    a roof-rack for receiving a rib support.

17. An automotive cargo or tray cover assembly as claimed in claim 1, configured so that the cover folds toward the cargo or tray area during retraction of the cover, the rib supports extending up over the tray area.

18. An automobile with a tray, the automobile fitted with the automotive cargo or tray cover assembly of claim 1.

19. A cover assembly including:
    a cover for covering a cargo or tray area of a vehicle;
    rib supports for translation over the area and supporting the cover, each rib support including upright legs for elevating the cover above the cargo or tray area;
    wherein the cover fastened with fastening arrangements on the rib supports, each fastening arrangement including a tongue-in-groove arrangement extending along the rib support and over the cargo or tray area, each tongue-in-groove arrangement including a bulbous tongue received in a complementarily-shaped groove; and a pair of guide rails located on opposite sides of the cargo or tray area for guiding said translation of the rib supports, wherein the cover is fastened to the rails using another fastening arrangement, said another fastening arrangement including another tongue-in-groove arrangement.

\* \* \* \* \*